United States Patent
von der Embse

(10) Patent No.: US 7,907,512 B1
(45) Date of Patent: Mar. 15, 2011

(54) OFDM AND SC-OFDM QLM

(75) Inventor: Urbain Alfred von der Embse, Westchester, CA (US)

(73) Assignee: Urbain A. von der Embse, Westchester, CA (US)

( * ) Notice: Subject to any disclaimer, the term of this patent is extended or adjusted under 35 U.S.C. 154(b) by 0 days.

(21) Appl. No.: 12/587,687

(22) Filed: Oct. 13, 2009

Related U.S. Application Data

(63) Continuation-in-part of application No. 12/380,668, filed on Mar. 3, 2009.

(51) Int. Cl.
*H04J 11/00* (2006.01)
*H04B 7/216* (2006.01)

(52) U.S. Cl. ......... 370/208; 370/210; 370/335; 370/342

(58) Field of Classification Search .................. 370/208, 370/210, 335, 342
See application file for complete search history.

(56) References Cited

U.S. PATENT DOCUMENTS

| | | |
|---|---|---|
| 6,426,723 B1 | 7/2002 | Smith |
| 6,504,506 B1 | 1/2003 | Thomas |
| 6,636,568 B2 | 10/2003 | Kadous |
| 6,647,078 B1 | 11/2003 | Thomas |
| 6,674,712 B1 | 1/2004 | Yang |
| 6,728,517 B2 | 4/2004 | Sugar |
| 6,731,618 B1 | 5/2004 | Chung |
| 6,731,668 B2 | 5/2004 | Ketchum |
| 6,798,737 B1 | 9/2004 | Dabak |
| 6,856,652 B2 | 2/2005 | West |
| 7,010,048 B1 | 3/2006 | Shattil |
| 7,277,382 B1 | 10/2007 | von der Embse |
| 7,337,383 B1 | 2/2008 | von der Embse |
| 7,352,796 B1 | 4/2008 | von der Embse |
| 7,376,688 B1 | 5/2008 | von der Embse |
| 7,391,819 B1 | 6/2008 | von der Embse |
| 7,394,792 B1 | 7/2008 | von der Embse |
| 7,558,310 B1 | 7/2009 | von der Embse |
| 2002/0136190 A1* | 9/2002 | Hata .............................. 370/344 |
| 2003/0063680 A1* | 4/2003 | Nedic et al. .................... 375/260 |
| 2004/0141570 A1* | 7/2004 | Yamazaki et al. ............. 375/340 |
| 2006/0239226 A1* | 10/2006 | Khan ............................. 370/329 |
| 2007/0297529 A1* | 12/2007 | Zhou et al. ..................... 375/267 |
| 2008/0137718 A1* | 6/2008 | Cha et al. ....................... 375/146 |
| 2008/0159442 A1* | 7/2008 | Tanabe et al. ................. 375/324 |
| 2009/0276671 A1* | 11/2009 | Fang et al. ..................... 714/748 |
| 2010/0098195 A1* | 4/2010 | Nekhamkin et al. .......... 375/344 |
| 2010/0166088 A1* | 7/2010 | Arambepola et al. ........ 375/260 |

OTHER PUBLICATIONS

U.S. Appl. No. 11/131,464, filed May 18, 2005, von der Embse.

(Continued)

*Primary Examiner* — Andrew Lee

(57) ABSTRACT

This invention provides a method for increasing the data rates supported by WiFi, WiMax, LTE communications using OFDM and SC-OFDM data symbol waveforms, by using quadrature layered modulation QLM which layers communications channels with a differentiating parameter for each layer that enables a demodulation algorithm to recover the data symbols in each layer, and supports higher data symbol rates then allowed by the Nyquist rate. A maximum likelihood (ML) QLM demodulation algorithm supports data rates to 4.75×57=271 Mbps compared to the current OFDM WiFi standard 57 Mbps with similar increases for WiMax, LTE. Multi-scale (MS) coding can be implemented to spread each data symbol over the OFDM band and over the 4 μs data packet to optimize BER performance. Computationally efficient signal processing for transmit and receive for OFDM and SC-OFDM are disclosed and Matlab direct error count Monte Carlo bit error rate simulations are evaluated to predict performance.

6 Claims, 20 Drawing Sheets

OTHER PUBLICATIONS

U.S. Appl. No. 12/069,418, filed Feb. 11, 2008, von der Embse.
U.S. Appl. No. 12/151,986, filed May 12, 2008, von der Embse.
U.S. Appl. No. 12/152,318, filed May 13, 2008, von der Embse.
U.S. Appl. No. 12/380,668, filed Mar. 3, 2009, von der Embse.
C.E. Shannon "A Mathematical Theory of Communications", Bell System Technical Journal, 27:379-423, 623-656, Oct. 1948.
Vucetec and J. Yuan's book "Turbo Codes", Kluwer Academic Publishers 2000.
J.G. Proakis's book "Digital Communications". McGraw Hill, Inc. 1995.
Hanzo, C.H. Wong, M.S. Lee's book "Adaptive Wireless Transceivers", John Wiley & Sons 2002.
Thomas S. Ferguson's book "Mathematical Statistics", Academic Press 1967.

* cited by examiner 25  1) New Nyquist data symbol rate = $n_p/T_s$ 26  2) New bound on capacity C and information rate "b"

$C = \max\{ n_p B \ \log_2(1+(S/N)/n_p{}^{\wedge}2) \}$ Bps, over $n_p$ $b = C/B$ bits/(symbol interval $T_s=1/B$ )

$= \max\{ n_p \ \log_2( 1 + (S/N)/n_p{}^{\wedge}2 ) \}$ over $n_p$ $= \eta$ Bps/Hz communication efficiency 27  3) $BT_s = 1 + \alpha$ where $\alpha$ is the excess bandwidth $= 1$ using a QLM Wavelet waveform

Step 1  Calculate $FFT^{-1}\{x(s|k)\} = [1 \times N]_x$ vector indexed on $i_0$ for state s Step 2  Generate the $[1 \times N]_s$ vector $z(i_0|s, \Delta)$ indexed on $i_0$ for block $\Delta$ of state s using the Matlab operation " .* " which multiplies like elements in the two vectors to yield $[1 \times N]_x .* [1 \times N]_\psi = [1 \times N]_s$ row vector $z(i_0|s, \Delta)$ defined by

12

$z(i_0|s, \Delta) = FFT^{-1}\{x(s|k)\} .* \psi(i_0 + i_r + (s-1)N/n_p + \Delta(s)N)$ Step 3  Construct the $[1 \times 5N]_s$ baseband signal vector for symbol s over the 4 μs data block using Matlab construction of the row vector using $[1 \times N]_s$ row vectors in step 2 for all values of $\Delta$ and zero row vectors to fill the remainder of the vector $[1 \times 5N]_s$

13

$z(i|s) = [z(\text{start}) \ldots z(i_0|s, \Delta=-1)\ z(i_0|s, \Delta=0)\ z(i_0|s, \Delta=+1) \ldots z(\text{finish})]$ Step 4  Sum the row vectors in step 3 to generate the Tx $[1 \times 5N]_z$ baseband signal vector $z(i)$ for the 4 μs WiFi QLM data packet

14

$z(i) = \Sigma_s\ z(i|s)$

FIG. 15

Step 1  Calculate the Rx $[1 \times N]_p$ pre-sum complex vector indexed on $i_0$ for state s
21

Pre-Sum=$\Sigma_{\Delta(s)}$ $z(i_0 + i_r + (s-1)N/n_p + \Delta(s)N)$ $\psi(i_0 + i_r + (s-1)N/n_p + \Delta(s)N)$, Step 2  Calculate the FFT of this pre-sum vector to generate the $[1 \times N]_p$ $[N \times 12] = [1 \times 12]_y$
22       Rx correlated signal vector y(s) for state s signal s with elements y(s|k)

$y(s) = [y(s|k=1)\ y(s|k=2)\ \ldots\ y(s|k=12)]$

Step 3  Repeat steps 1 & 2 for all of the states $s=1,2,\ldots, N_s=(n_s-1)\ xn_p+1$ to generate the
23       $[N_s \times 12]$ correlated signal matrix Y with $[1 \times 12]_y$ row vectors y(s) for each row s
         and $[N_s \times 1]$ column vectors $y(k) = [y(s=1|k);\ y(s=2|k);\ \ldots;\ y(N_s|k)\}$ for each
         column k Step 4  For each column y(k) of Y calculate the solution x(k) of the ML equation
24       $x(k) = H^{-1}\ y(k)$
         wherein   $x(k) = [x(s=1|k);\ x(s=2|k);\ \ldots;\ x(s=N_s|k)\ ]$ = column vector
                   whose elements are the estimates of the Tx data symbols x(s|k)
                   $H = [N_s \times N_s]_h$ correlation matrix Step 5  Data symbol estimates for each subband k are demodulated to recover the data
25       words and soft-decision decoded to recover the information bits in each data word

1) N-chip complex Walsh code $\underline{W}$ components are lexicographically reordered real Walsh W codes $\underline{W}(c) = $ Nx1 complex Walsh code vector $c$
$\quad\quad\quad = W(cr) + j\, W(ci)\quad$ for real Walsh codes indexed on cr, ci where
$\quad c = 0 \quad\quad\quad\quad\quad cr = 0 \quad\quad\quad\quad\quad ci = 0$
$\quad c = 1:N/2-1 \quad\quad cr = 2c \quad\quad\quad\quad ci = 2c-1$
$\quad c = N/2 \quad\quad\quad\quad cr = N-1 \quad\quad\quad\, ci = N-1$
$\quad c = N/2+1:N/2-1 \quad cr = N-1-2x1:N/2-1 \quad cr = N-2x1:N/2-1$

151

2) 8x8 complex Walsh code matrix $\underline{W}_8$ $$\underline{W}_8 * (1-j)/\sqrt{2} = \begin{bmatrix} 1 & 1 & 1 & 1 & 1 & 1 & 1 & 1 \\ 1 & 1 & j & j & -1 & -1 & -j & -j \\ 1 & 1 & -1 & -1 & 1 & 1 & -1 & -1 \\ 1 & 1 & -j & -j & -1 & -1 & j & j \\ 1 & -1 & j & -j & 1 & -1 & j & -j \\ 1 & -1 & -1 & 1 & 1 & -1 & -1 & 1 \\ 1 & -1 & -j & j & 1 & -1 & -j & j \\ 1 & -1 & 1 & -1 & -1 & 1 & -1 & 1 \end{bmatrix}$$ 152

152

3) Generalized complex Walsh codes $\underline{W}$=Tensor product of Complex Walsh, DFT, other codea

FIG. 17

OFDM AND SC-OFDM QLM

This patent filing is a continuation in part of application Ser. No. 12/380,668 filed on Mar. 3, 2009.

BACKGROUND OF THE INVENTION

I. Field of the Invention

The present invention relates to cellular communications and also relates to the Nyquist rate for data symbol transmission, the Shannon bound on communications capacity, and symbol modulation and demodulation for high-data-rate satellite, airborne, wired, wireless, and optical communications and includes all of the communications symbol modulations and the future modulations for single links and multiple access links which include electrical and optical wired, mobile, point-to-point, point-to-multipoint, multipoint-to-multipoint, cellular, multiple-input multiple-output MIMO, and satellite communication networks. In particular it relates to WiFi, WiMax and long-term evolution LTE for cellular communications and satellite communications. WiFi, WiMax use orthogonal frequency division multiplexing OFDM on both links and LTE uses SC-OFDM on the uplink from user to base station and OFDM on the downlink form base station to user. WiMax occupies a larger frequency band than WiFi and both use OFDM waveforms. SC-OFDM is a single carrier orthogonal waveform version of OFDM which uses orthogonal frequency subbands of varying widths.

II. Description of the Related Art

Two fundamental bounds on communications are the Nyquist rate and the Shannon capacity theorem. The Nyquist rate is the complex digital sampling rate equal to B that is sufficient to include all of the information within a frequency band B. For communications, equivalent expressions for the Nyquist rate bound are defined in equations (1).

$$T_s \geq 1/B \quad (1)$$

$$BT_s \geq 1$$

wherein $1/T_s$ is the data symbol transmission rate in the frequency band B which means $T_s$ is the spacing between the data symbols.

The Shannon bound for the maximum data rate C is a bound on the corresponding number of information bits per symbol b as well as a bound on the communications efficiency $\eta$ and is complemented by the Shannon coding theorem, and are defined in equations (2).

Shannon bounds and coding theorem (2)

1 Shannon capacity theorem $C = B \log_2(1 + S/N)$ Channel capacity in bit/second = Bps for an additive white Gaussian noise AWGN channel with bandwidth B wherein "$\log_2$" is the logarithm to the base 2

= Maximum rate at which information can be reliably transmitted over a noisy channel where S/N is the signal-to-noise ratio in B 2 Shannon bound on b, $\eta$, and $E_b/N_o$ $\max\{b\} = \max\{C/B\}$ $= \log_2(1 + S/N)$ $= \max\{\eta\}$ $E_b/N_o = [2^{\wedge}\max\{b\} - 1]/\max\{b\}$ wherein $b = C/B$ in Bps/Hz = Bits/symbol $\eta = b/T_s B$, Bps/Hz $T_s$ = symbol interval 3 Shannon coding theorem for the information bit rate $R_b$ For $R_b < C$ there exists codes which support reliable communications For $R_b > C$ there are no codes which support reliable communications wherein $E_b/N_o$ is the ratio of energy per information bit $E_b$ to the noise power density $N_o$, $\max\{b\}$ is the maximum value of the number of information bits per symbol b and also is the information rate in Bps/Hz, and since the communications efficiency $\eta = b/(T_s B)$ in bits/sec/Hz it follows that maximum values of b and $\eta$ are equal. Derivation of the equation for $E_b/N_o$ uses the definition $E_b/N_o = (S/N)/b$ in addition to 1 and 2. Reliable communications in the statement of the Shannon coding theorem 3 means an arbitrarily low bit error rate BER.

OFDM is defined in FIG. 1 for the WiFi 802.16 standard power spectrum in 1,2 which implements the inverse FFT (IFFT=FFT$^{-1}$) to generate OFDM (or equivalently OFDMA which is orthogonal frequency division multiple access to emphasize the multiple access applications) data symbol tones 2 over the first 3.2 μs of the 4 μS data packet in 30 in FIG. 7 with some rolloff of the tones at their ends for spectral containment. Data symbol tones are modulated with 4 PSK, 16QAM, 64QAM, 256QAM depending on the transmission range and data rate and for 256QAM using the code rate option R=¾ yields the information rate b=6 Bps/Hz for the WiFi standard, with other code options available. The N=64 point FFT$^{-1}$ generates N=64 tones in 2 over the 20 MHz WiFi band with 48 tones used for data transmission. In 3 the WiFi parameters are defined including a calculation of the maximum data rate $R_b$=57 Mbps. Later versions of WiFi allow WiFi bands of 1.25, 5, 10, 20 MHz corresponding to N=4, 16, 32, 64. For this representative OFDM WiFi QLM disclosure we are considering the WiFi standard in FIG. 1. The maximum data rate supported by WiFi standard is calculated in 3 to be ~57 Mbps using 256QAM modulation and wherein "~" represents an approximate value. OFDM uses pulse waveforms in time and relies on the OFDM tone modulation to provide orthogonality. SC-OFDM is a pulse-shaped OFDM that uses shaped waveforms in time to roll-off the spectrum of the waveform between adjacent channels to provide orthogonality, allows the user to occupy subbands of differing widths, and uses a different tone spacing, data packet length, and sub-frame length compared to OFDM for WiFi, WiMax.

SUMMARY OF THE INVENTION

This invention introduces a maximum likelihood ML demodulation architecture and implementation of a quadrature layered modulation QLM for OFDM and SC-OFDM modulations to provide a method for increasing the data rates. QLM for OFDM WiFi provides a method for increasing the data rates to 4.75× WiFi maximum data rate with current technology (4.75 times the WiFi maximum rate) and to 6× WiFi maximum data rate with technology advances. QLM provides similar increases in data rate for OFDM WiMax and SC-OFDM LTE. QLM supports data symbol rates that can be multiples of the Nyquist rate and communications data rates that can be multiples of the Shannon bound.

A representative OFDM QLM architecture using ML demodulation is disclosed in this invention for WiFi standard and the transmit and receive signal processing algorithms and supporting block diagrams are developed to illustrate the architecture and implementation. This architecture is directly applicable to WiMax by increasing the number of OFDM tones to occupy the increased WiMax frequency band and also is directly applicable to SC-OFDM since the OFDM QLM ML architecture uses a pulse-shaped OFDM which partitions the frequency band into orthogonal subbands that can be combined to enable users to use differing frequency bands to implement SC-OFDM.

QLM is a layered topology for transmitting higher data rates than possible with a single layer of communications and is implemented by transmitting each layer with a differentiating parameter which enables separation and decoding of each layer. For a representative OFDM architecture the OFDM WiFi QLM transmits the QLM signals over a set of subbands which together occupy the same frequency band as the WiFi standard 48 data symbol modulated $FFT^{-1}$ tones and over the WiFi 4 μs data packet. Computationally efficient fast multi-channel $FFT^{-1}$ and FFT algorithms generate the sub-band QLM data symbols for transmission and implement the receive detection followed by maximum likelihood ML demodulation, which can be implemented with a chip architecture that supports both OFDM WiFi and the OFDM WiFi QLM in this invention disclosure as well as both OFDM WiMax and OFDM WiMax QLM with an increase in the frequency band, and with parameter changes the chip architecture supports both SC-OFDM LTE and SC-OFDM LTE QLM uplinks and both OFDMA LTE and OFDMA LTE QLM downlinks. Monte Carlo Matlab direct error count bit-error-rate BER simulations for ML demodulation used in OFDM WiFi QLM demonstrate the QLM performance.

A multi-scale MS code can be implemented with modest complexity in order to improve the bit-error-rate BER performance of OFDM WiFi QLM by spreading each transmitted data symbol over the OFDM WiFi QLM data band and over the 4 μs data packet. Jensen's inequality from mathematical statistics proves that this uniform spreading of the Tx signals using MS provides the best communications BER performance.

BRIEF DESCRIPTION OF THE SEVERAL VIEWS OF THE DRAWINGS

The above-mentioned and other features, objects, design algorithms, and performance advantages of the present invention will become more apparent from the detailed description set forth below when taken in conjunction with the drawings and performance data wherein like reference characters and numerals denote like elements and in which:

FIG. 4 presents the equations for the communications capacity predicted by the new bound, the new Nyquist data symbol rate, and the $BT_S$ product for a Wavelet waveform.

FIG. 15 presents the implementation steps in the transmitter to generate the OFDM WiFi QLM baseband signal vector starting with the input data symbols for the 4 μs data packet FIG. 16 presents the implementation steps in the receiver to recover the estimated OFDM WiFi QLM input data symbols starting with the received OFDM WiFi QLM baseband signal vector for the 4 µs data packet.

FIG. 17 defines the complex Walsh codes and the generalized complex Walsh codes.

DETAILED DESCRIPTION OF THE INVENTION

OFDM and SC-OFDM applications of quadrature layered modulation QLM in this invention disclosure are illustrated by the WiFi 802.16 standard which uses OFDM on both uplinks and downlinks between the user and base station for cellular communications as well as for communications with satellites. OFDM WiFi QLM replaces the OFDM orthogonal data symbol tones with orthogonal subbands which are the same architecture as SC-OFDM used for the LTE uplink. This means the OFDM WiFi QLM architecture is directly applicable to WiMax by simply increasing the number of subbands since they both use the same OFDM and 4 µs data packets with WiMax using a larger frequency band, and also is directly applicable to the LTE uplink since the OFDM WiFi QLM orthogonal subbands partition the frequency spectrum using the same architecture as SC-OFDM for LTE to allow the various users to be assigned differing orthogonal frequency subbands across the frequency band and the QLM data symbol waveforms in these subbands are SC-OFDM subband shaped waveforms used for LTE. The OFDM WiFi QLM architecture is directly applicable to LTE downlinks which use OFDM.

OFDM WiFi QLM uses maximum likelihood ML demodulation of the quadrature layered modulation QLM received correlated data symbols to support an architecture and implementation for QLM communications using the WiFi 4 µs data packet over the 20 MHz WiFi band for the WiFi standard and with obvious extensions to the other WiFi versions.

Figure 2:
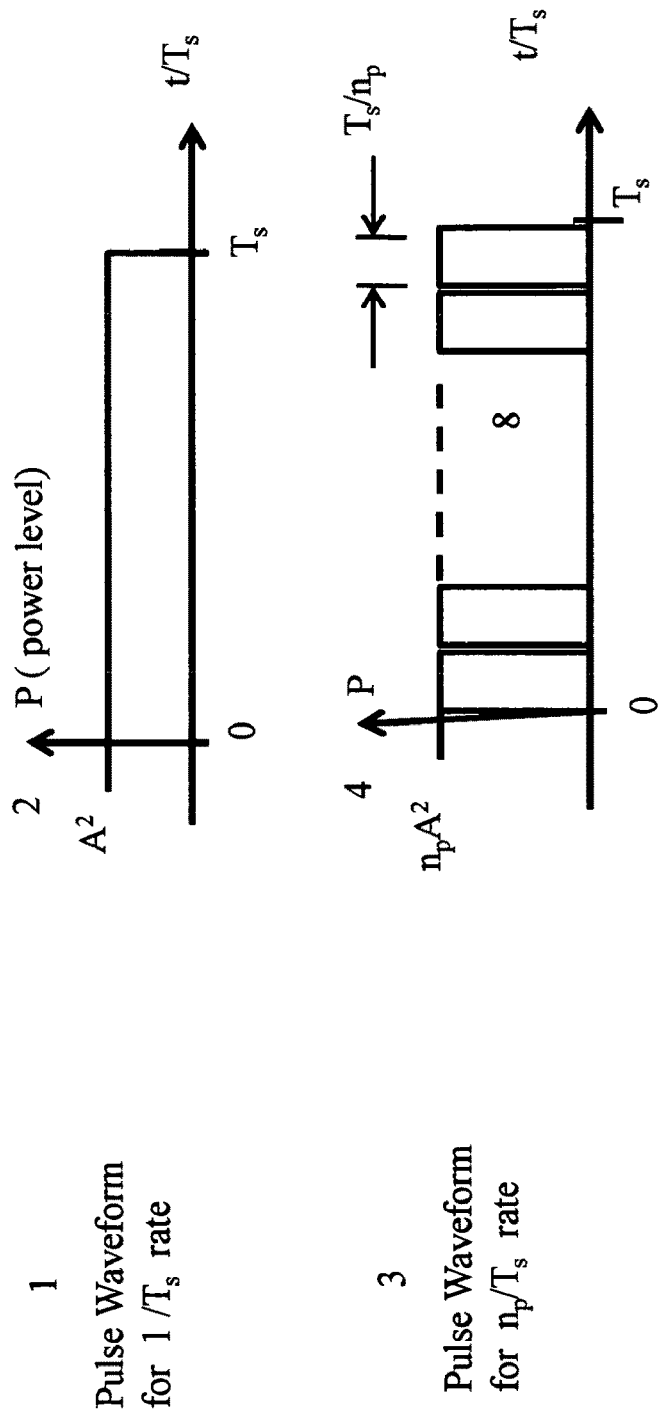
FIG. 2 describes how to increase the data rate using a pulse waveform.

FIG. 2 introduces QLM by considering an ideal pulse waveform in the time domain. In 1 the pulse waveform is transmitted at the data symbol rate equal to $1/T_s=B$ where $T_s$ is the pulse length, B is the bandwidth, the signal power level 2 is $P=A^2$ where "A" is the signal amplitude, and the pulse modulation is phase shift keying PSK with "b" information bits per data symbol. To increase the data symbol rate to $n_p/T_s$ and the information rate to $n_p b/T_s$, the pulse waveform is shortened 3 to $T_s/n_p$ which increases the bandwidth to $n_p B$ wherein $B=1/T_s$ and requires the transmitted power to be increased 4 to $P=n_p A^2$ in order to keep the same pulse energy per bit 5 is $E_b=A^2 T_s/b$. The corresponding energy-per-bit to noise power ratio 6 is $E_b/N_o$ $A^2/2\sigma^2 b$ where 7 $N_o=2\sigma^2 T_s$ is the noise power density and $2\sigma^2$ is the "mean square" level of communication noise.

Figure 3:
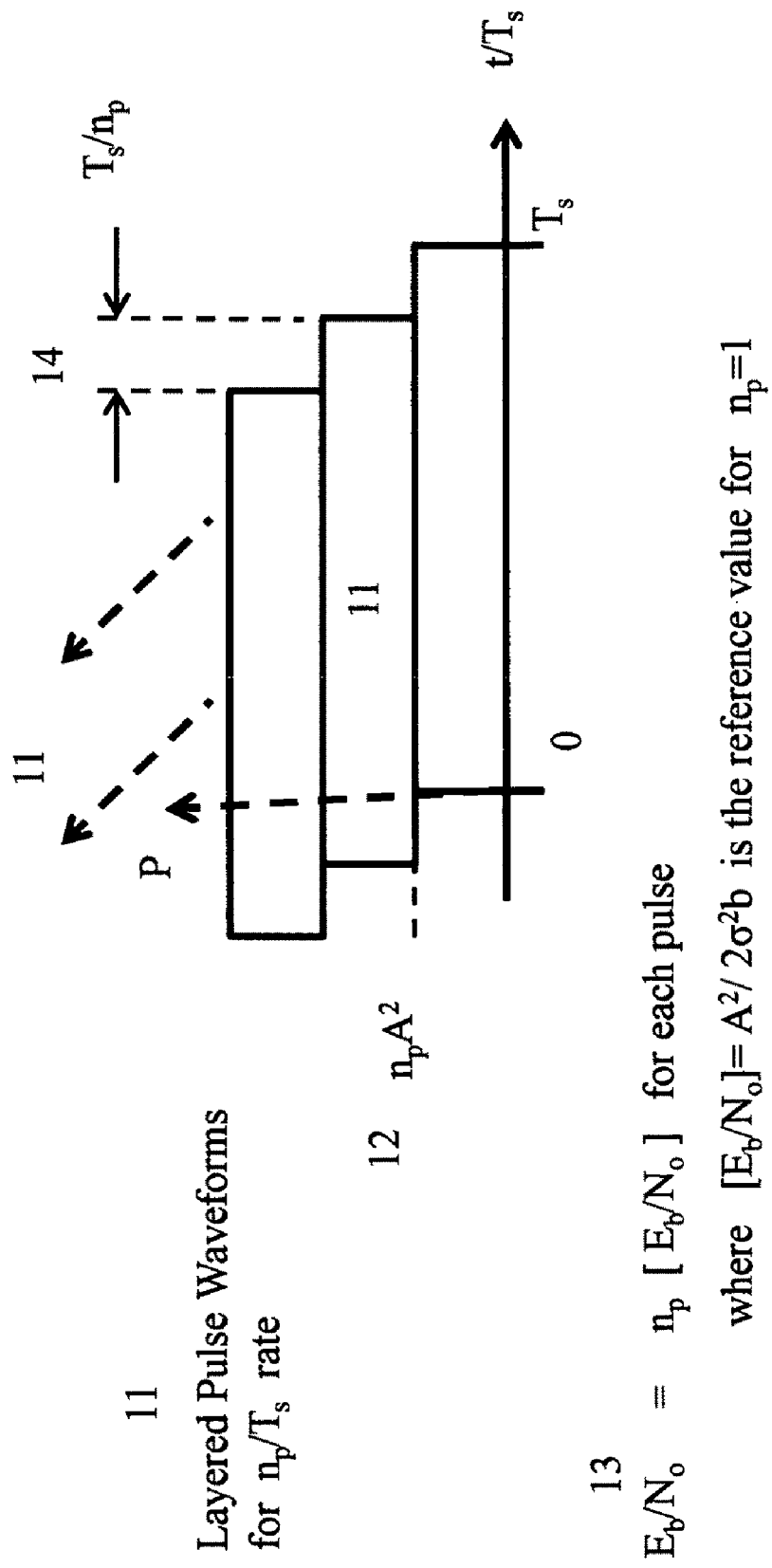
FIG. 3 describes how QLM increases the data rate for a pulse waveform at a constant frequency bandwidth.

FIG. 3 implements this increase in the data symbol rate using QLM communications without changing the bandwidth of the pulse waveform by extending the pulses 8 in FIG. 2 over the original pulse length $T_s$ and layering these extended data symbol waveforms on top of each other 11 while occupying the same bandwidth $B=1/T_s$. The pulse waveforms in each layer 13 have $E_b/N_o$ values equal to $n_p$ times the original $E_b/N_o=A^2/2\sigma^2 b$ due to the stretching of each pulse over $T_s$ without changing the power level of the pulse. The layers are time synchronized for transmission at $\Delta T_s = T_s/n_p$, $2\Delta T_s$ ..., $(n_p-1)\Delta T_s$ offsets 14 respectively for layers 2, 3, ..., $(n_p-1)$ relative to the 1$^{st}$ layer at zero offset. This means the signal-to-noise power S/N over $B=1/T_s$ is equal to $n_p\hat{~}2$ times the original S/N due to the addition of the $n_p$ pulse power levels 12 over each $T_s$ interval and the scaling of $E_b/N_o$ by $n_p$. This scaling of $E_b/N_o$ in each of the layered communications channels is summarized in equation (3) along with the corresponding scaling of the S/N over $T_s$. We find $$E_b/N_o = n_p[E_b/N_o] \text{ for each layer or channel} \quad (3)$$
$$= n_p[A^2/2\sigma^2 b]$$
$$S/N = \sum n_p E_b/N_o \text{ over } n_p \text{ layer or channels}$$
$$= n_p \wedge 2[S/N]$$

wherein ["o"] is the value of "o" for the communications channel when there is no layering.

FIG. 3 describes the layering of the communications channels for QLM and equation (3) defines the QLM scaling of the $E_b/N_o$ and S/N. QLM is a layered topology for transmitting higher data rates than possible with each layer of communications and is implemented by transmitting each layer with a differentiating parameter which enables separation and decoding of each layer. Each layer or channel has a unique differentiating parameter such as time offset as in FIG. 3 and/or frequency offset. Each layer or channel obeys Shannon's laws when using QLM scaling in equations (3).

The equations for the non-optimized channel capacity in Bps and information bits b per symbol interval are the Shannon's bounds in 1,2 in equation (2) with the maximum "max" removed, with the [S/N] scaling in equations (3), and with the multiplication by "$n_p$" to account for the $n_p$ layers. We find $$C = n_p B \log_2[1 + (S/N)/n_p \wedge 2] \quad \text{Bps} \quad (4)$$
$$b = n_p \log_2[1 + (S/N)/n_p \wedge 2] \quad \text{Bps/Hz} = \text{Bits/symbol interval}$$

using the definition b=CB in Bps/Hz=Bits/symbol from 2 in equations (2) and observing that "Bits/symbol" in 2 is "Bits/symbol interval" for QLM and wherein it is understood that the C,b are non-optimized values with respect to the selection of the $n_p$.

New upper bounds on C, b, η and a new lower bound on $E_b/N_o$ are derived in equations (5) by using equation (4) and equation (2). We find New capacity bounds and coding theorem (5)

1  $C = \max\{n_p B \log_2[1 + (S/N)/n_p \wedge 2]\}$

2  $\max\{b\} = \max\{n_p \log_2[1 + (S/N)/n_p \wedge 2]\}$
$= \max\{n_p \log_2[1 + (b\, E_b/N_o)n_p \wedge 2]\}$
$= \max\{\eta\}$ 3  $\min\{E_b/N_o\} = \min\{[n_p \wedge 2/b][2 \wedge b/n_p - 1]\}$ 4. New coding theorem For $R_b < C$ there exists codes which support reliable communications For $R_b > C$ there are no codes which support reliable communications 5. New symbol rate $n_p/T_s$ $$\max\{n_p/T_s\} = n_pB \text{ for } n_p \text{ layers of communications}$$
$$= n_px \text{ (Nyquist rate for 1 channel)}$$

wherein the maximum values of C, max{b}, and max{η} of C, b, η are the respective maximums of the expressions in equation (4) with respect to $n_p$, the units of C, b, η are Bps, information bits/symbol interval, and Bps/Hz which means b is expressed in units Bps/Hz as well as in units of information bits/symbol interval, and the min{$E_b/N_o$} is the minimum of $E_b/N_o$ with respect to $n_p$ similar to the derivation in 2 in equations (2).

The new coding theorem in 4 in equations (5) states that C is the upper bound on the information data rate $R_b$ in bits/second for which error correcting codes exist to provide reliable communications with an arbitrarily low bit error rate BER wherein C is defined in 1 in equations (5) and upgrades the Shannon coding theorem 3 in equations (1) using new capacity bound C in 1 in equations (5) and introduces the new data symbol rate 5 whose maximum value max{$n_p/T_s$} is $n_p$ times the Nyquist rate for a single channel.

FIG. 4 restates the new communications bound in U.S. Pat. No. 7,391,819 in a format suitable for implementations. Listed are the new Nyquist rate 25, new bounds on C, b, η in 26, and the assumed bandwidth-time product in 27 with the note that the excess bandwidth a is zero α=0 for a QLM Wavelet waveform from U.S. Pat. No. 7,376,688 and filing Ser. No. 12/152,318.

Figure 5:
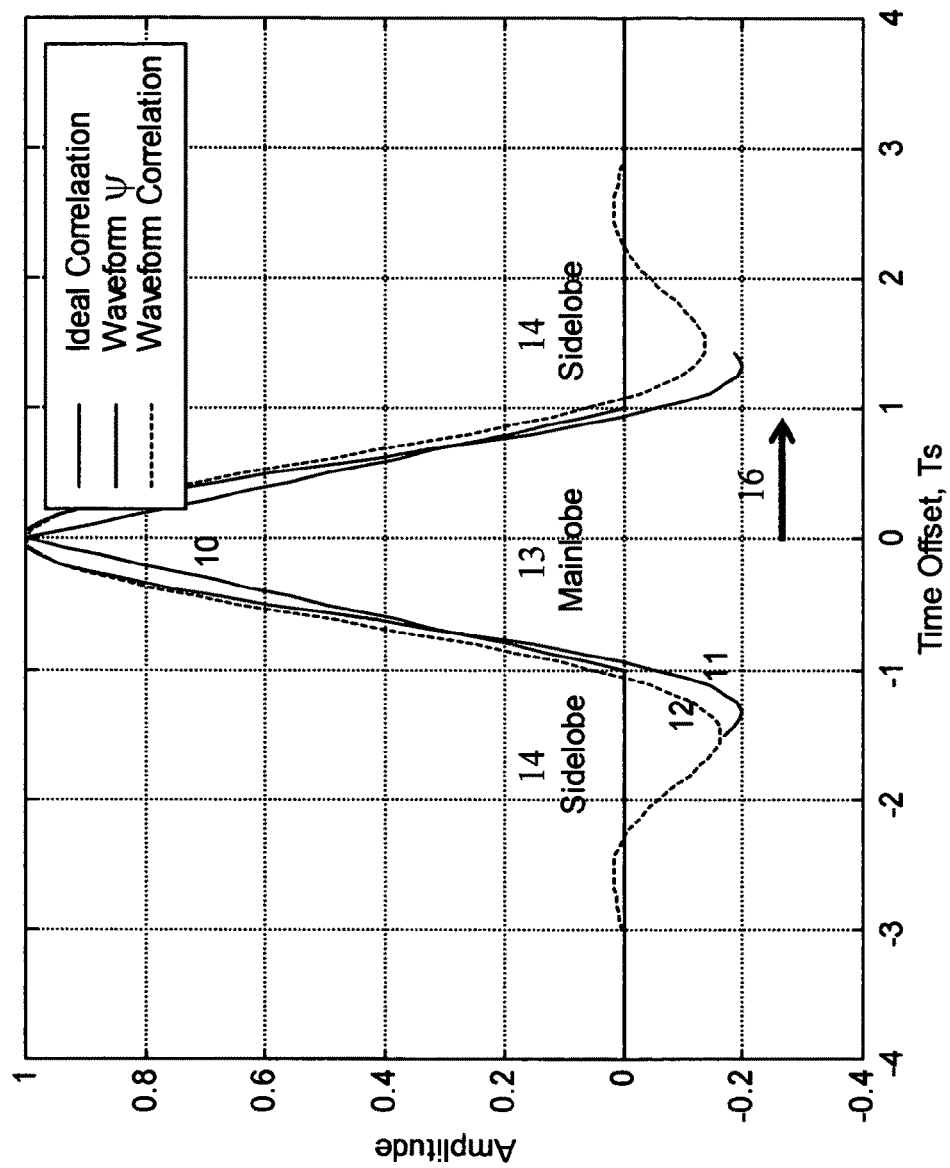
FIG. 5 calculates the ideal pulse correlation, candidate waveform $\Psi$ time response, and the $\Psi$ correlation.

QLM demodulation received signal processing synchronizes and removes the received waveform by performing a convolution of the received waveform encoded data symbol with the complex conjugate of this waveform, to detect the correlated data symbols. This convolution is a correlation of the waveform with itself as illustrated in FIG. 5 since the waveforms are real and symmetric. These correlated data signals are processed with a trellis algorithm to recover estimates of the encoded symbol data, or processed by a ML algorithm to recover estimates of the data symbols, or processed by a recursive relaxation algorithm or another demodulation algorithm to recover the transmitted data symbols.

FIG. 5 calculates the ideal triangular correlation 10, an example waveform 11 designated by Ψ, and the waveform Ψ correlation 12. Parameters of interest for this example square-root raised-cosine waveform are the waveform length L=3, M=16, and excess bandwidth α=0.22, the mainlobe 13 which extends over a $2T_s$ interval, and the sidelobes 14 which fall outside of the mainlobe. Parameter L is the waveform length in units of M=16 samples and M is the number of digital samples between adjacent waveforms at a Nyquist symbol rate=1/$T_s$ for which $T_s$=MT where 1/T is the digital sample rate and α is a measure of the roll-off of the frequency response. The ideal triangular correlation is the correlation for the pulse waveform of length $T_s$ in FIG. 3 and FIG. 5 demonstrates that for waveforms of interest for QLM the triangular correlation approximates the mainlobe correlations for QLM waveforms.

Figure 6:
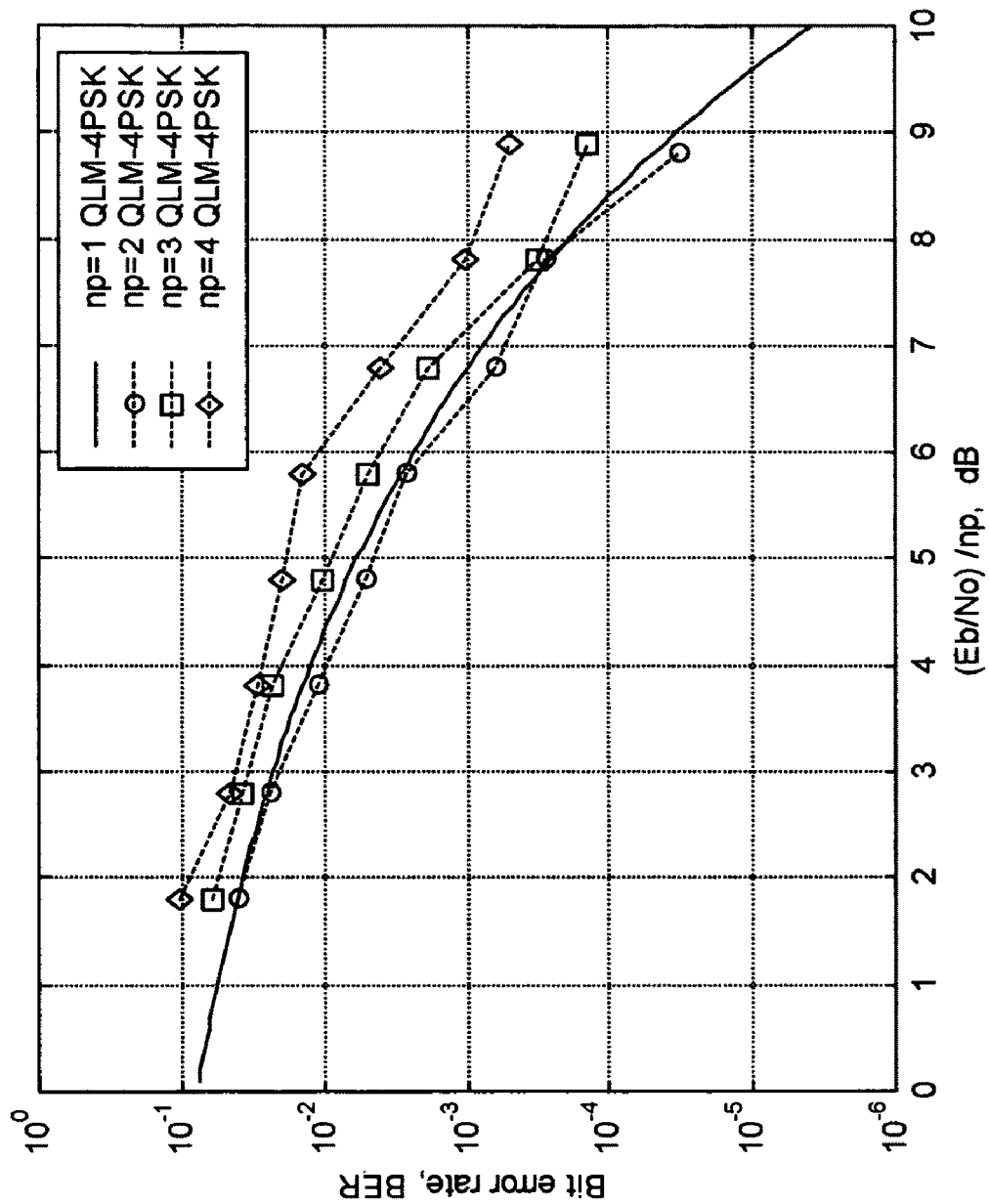
FIG. 6 presents the measured bit error rate BER performance of a pulse waveform with 4 PSK modulation for QLM layers $n_p$=1,2,3,4 using a Trellis demodulation algorithm.

FIG. 6 measures the trellis decoding performance for uncoded 4-PSK for $n_p$=1 and for $n_p$=2,3,4 layers of QLM modulation by implementing the trellis symbol decoding algorithm in U.S. Pat. No. 7,391,819 and validates the QLM technology and scaling. Performance is plotted as bit error rate BER versus the normalized value ($E_b/N_o$)/$n_p$ of the $E_b/N_o$ for the new bound from equations (3),(5). Normalization means that for a given BER the ($E_b/N_o$)/$n_p$ has the same value for all $n_p$. For example, this means that BER=0.001 requires ($E_b/N_o$)/$n_p$=6.8 dB and for $n_p$=1,2,4 this requires $E_b/N_o$=6.8+0=6.8, 6.8+3=9.8, 6.8+6=12.8 dB respectively. Measured performance values for $n_p$=2,3,4 are from a direct error count Monte Carlo simulation of the trellis algorithm and are plotted in FIG. 6 as discrete measurement points.

Figure 7:
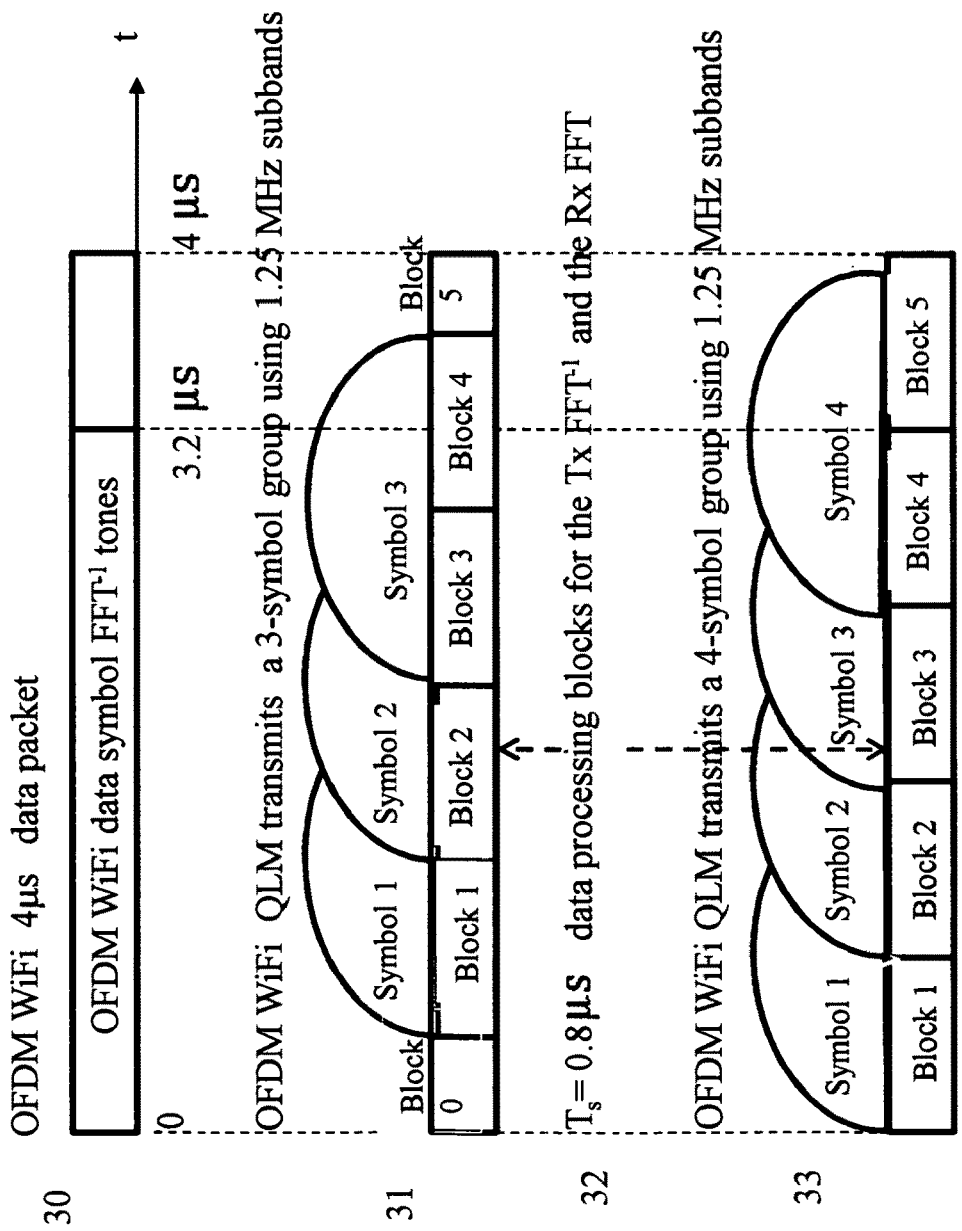
FIG. 7 describes the OFDM WiFi QLM 3-data symbol group and 4-data symbol group in each of the subbands and over the 4 μs WiFi data packet.

FIG. 7 is a representative OFDM WiFi QLM architecture and implementation used to illustrate the implementation and performance. The OFDM WiFi QLM architecture partitions the WIFi 20 MHz frequency band into 16 1.25 MHz subbands and uses the WiFi 4 μS data packet 30 to transmit the maximum likelihood ML 3,4-data symbol groups in each OFDM WiFi QLM data subband by partitioning the data packet into data processing blocks for implementation of the OFDM WiFi QLM for transmission Tx using a post-weighted inverse fast fourier transform N-point $FFT^{-1}$ algorithm and for the receiver Rx using a pre-weighted fast fourier transform N-point FFT algorithm followed by a ML demodulation algorithm. These processing blocks 32 are the data symbol separation $T_s$=0.8 μs=NT for QLM transmission in the OFDM WiFi QLM subbands wherein 1/T is the sample rate (bandwidth) of the $FFT^{-1}$ and FFT. Mainlobes of the representtive waveforms in FIG. 5 for the 3,4-data symbol groups are depicted in 31 and 33 and each extends over a 2Ts length as depicted in 13 in FIG. 5

In FIG. 7 the $n_s$=3-data symbol group 31 and the $n_s$=4-data symbol group 33 comprise 3 and 4 symbols labeled 1,2,3 and 1,2,3,4 respectively for the QLM ground layer $n_p$=1. The data symbols for the additional layers are overlayed as shown in FIG. 2 on data symbols 1,2 and 1,2,3 and extend over data symbol 3 and 4 respectively. This layering means that for $n_p$ layers the reference positions for the data symbols are 1, 1+1/$n_p$, 1+2/$n_p$, ..., 3 and 4 respectively corresponding to data symbols s=1, 2, ..., $N_s$=($n_s$−1)$n_p$+1 wherein $n_s$ is the number of contiguous data symbols in the ground layer group, $N_s$ is the number of data symbols in the $n_s$-data symbol group for $n_p$ layers, and the index s identifies the data symbols in the order they are processed in the transmitter and in the receiver.

FIG. 7 OFDM WiFi QLM architecture for the $n_s$-data symbol groups allows the ML system equations to be written in equation (6) for each set of $N_s$ detected correlated data symbols over the OFDM WiFi QLM 4 μs data packet in each of the subbands k and enables a ML demodulation algorithm to be implemented to recover the estimates of the data symbols. System equations (6) calculate the received Rx detected data symbol vector y(k) as a linear sum of the transmitted Tx data symbol vector x(k) multiplied by the correlation matrix H plus the Rx noise vector u(k). We find $$y(k)=H \times (k)+u(k) \qquad (6)$$

wherein

Y(k)=$N_s$×1 detected symbol vector. in subband k.

H=$N_s$×$N_s$ correlation matrix of data symbols x(k)=$N_s$×1 data symbol vector for layered channels in subband k u(k)=$N_s$×1 demodulation plus link noise vector for subband k wherein the Rx data symbol vector y(k) elements are y(s|k) which is the Rx detected correlated signal for state s=symbol s for subband k, the data symbol vector x(k) elements are x(s|k) which is the Tx data symbol x(s|k) for symbol s, u(k) is the noise vector, and "x" is the multiply operator. In this disclosure the same notation will be used for the estimates x(k), x(s|k) and for the true values x(k),x(s|k) respectively with the interpretation defined in the text. Equation (7) lists the ML solution. We find $$\begin{aligned}
&1\ ML\ \text{Cost is:}\ \ J = [y(k) - Hx(k)]'Q^{-1}[y(k) - Hx(k)] \quad (7)\\
&\qquad\qquad\qquad\quad = (-)\text{exponent of the } ML\\
&\qquad\qquad\qquad\quad \text{probability density function}\\
&2\ ML\ \text{solution which minimizes } J\ \text{is:}\ x(k) = [H'Q^{-1}H]^{-1}H'Q^{-1}y(k)\\
&\qquad 3\ \text{The noise covariance is:}\ Q = E[u(k)u(k)']\\
&\qquad 4\ ML\ \text{solution simplifies to:}\ x(k) = H^{-1}y(k)
\end{aligned}$$

since the inverse $H^{-1}$ exists for all applications of interest, and wherein H' is the conjugate transpose of H, and $2\sigma^2$ is the mean-square data symbol detection noise.

Figure 8:
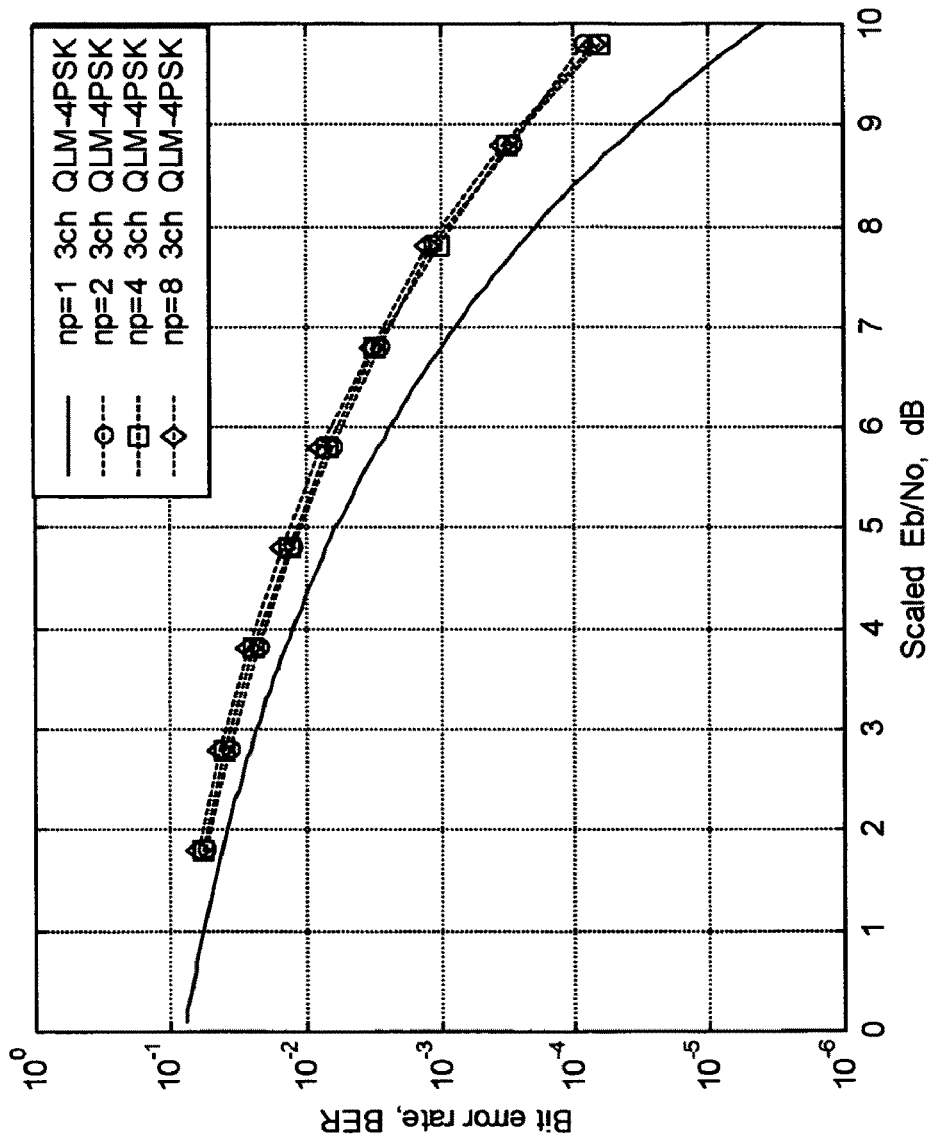
FIG. 8 presents the measured BER performance of a pulse waveform with 4 PSK modulation for QLM layers $n_p$=1,2,4,8 for a 3-data symbol group using a maximum likelihood ML demodulation algorithm.
Figure 9:
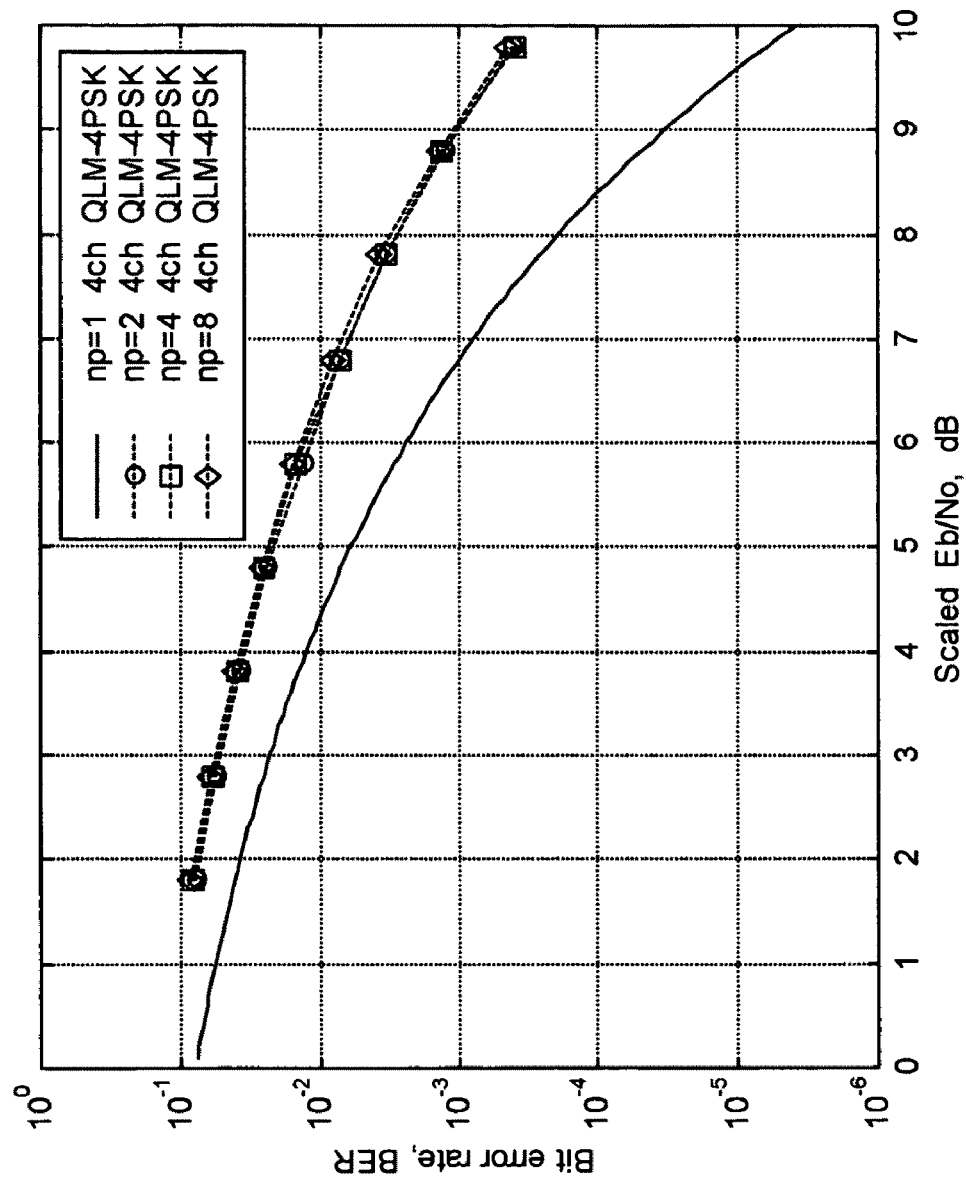
FIG. 9 presents the measured BER performance of a pulse waveform with 4 PSK modulation for QLM layers $n_p$=1,2,4,8 for a 4-data symbol group using a ML demodulation algorithm.

FIGS. 8,9 measure the Monte Carlo bit error rate BER vs. the scaled $(E_b/N_o)/n_p$ from equations (3) for the 3-data symbol and 4-data symbol groups in the OFDM WiFi QLM architecture in FIG. 7 with $n_p$=1,2,4,8 layers using 4 PSK symbol encoding and waveforms with ideal correlations in FIG. 5 and the measured data validates the QLM technology and scaling. These BER measurements also apply to Wavelet and other waveforms since their correlations closely approximate ideal correlations in FIG. 5. Measured BER performance losses compared to ideal 4 PSK are expected to be the same for all data symbol modulations including 8 PSK, 16QAM, 64QAM, 256QAM, 2048QAM since the ML demodulation estimates the data symbols in each layer independent of the data symbol modulation. The 4 PSK modulation was used as a convenient modulation to measure the ML demodulation loss which loss is expected to apply to all data symbol modulations.

Figure 10:
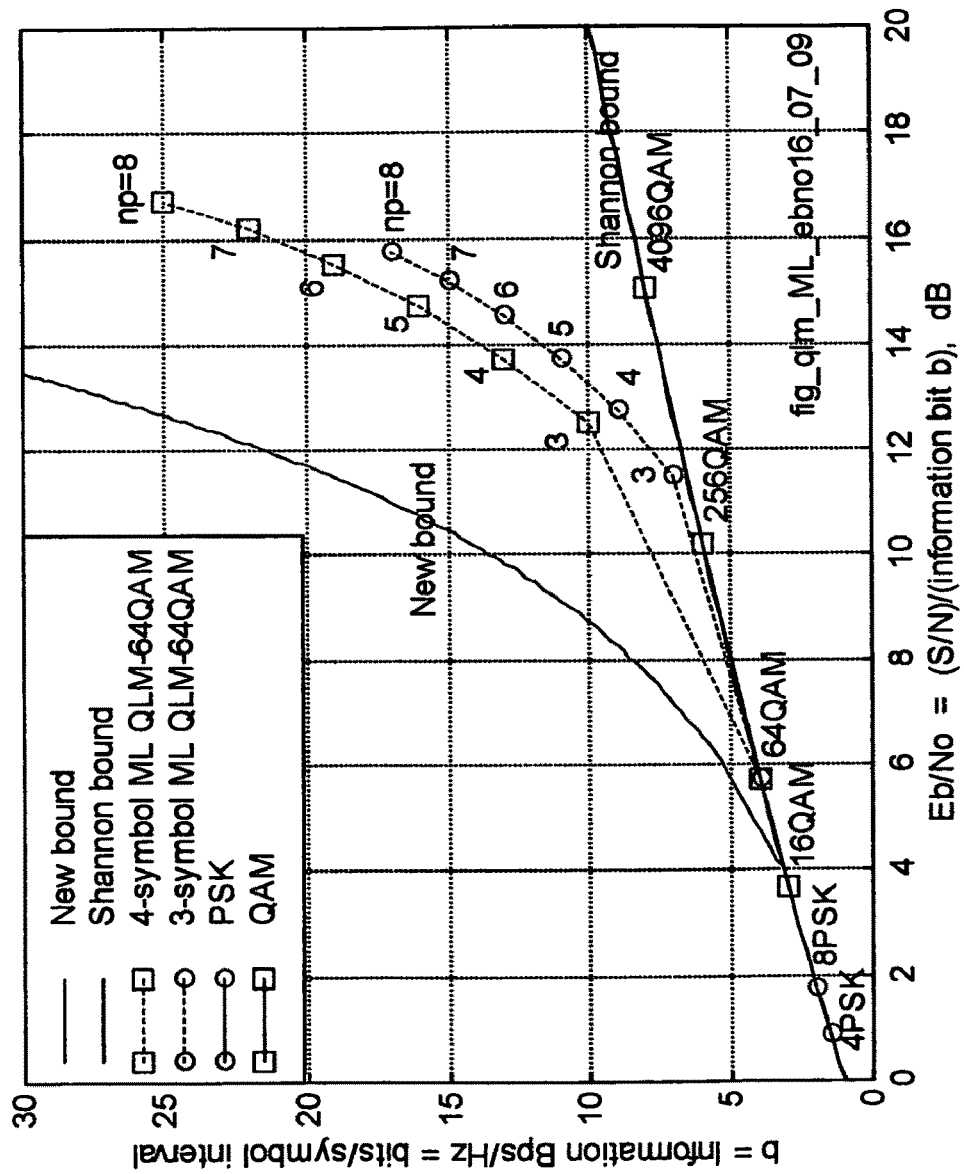
FIG. 10 for the OFDM architecture calculates the information bits b per symbol interval equivalently expressed as Bps/Hz versus $E_b/N_o$ for the new bound, Shannon bound, for PSK, QAM with turbo coding to bring the performance to essentially equal to the Shannon bound, and for QLM 3,4-data symbol group performance using 64QAM.
Figure 11:
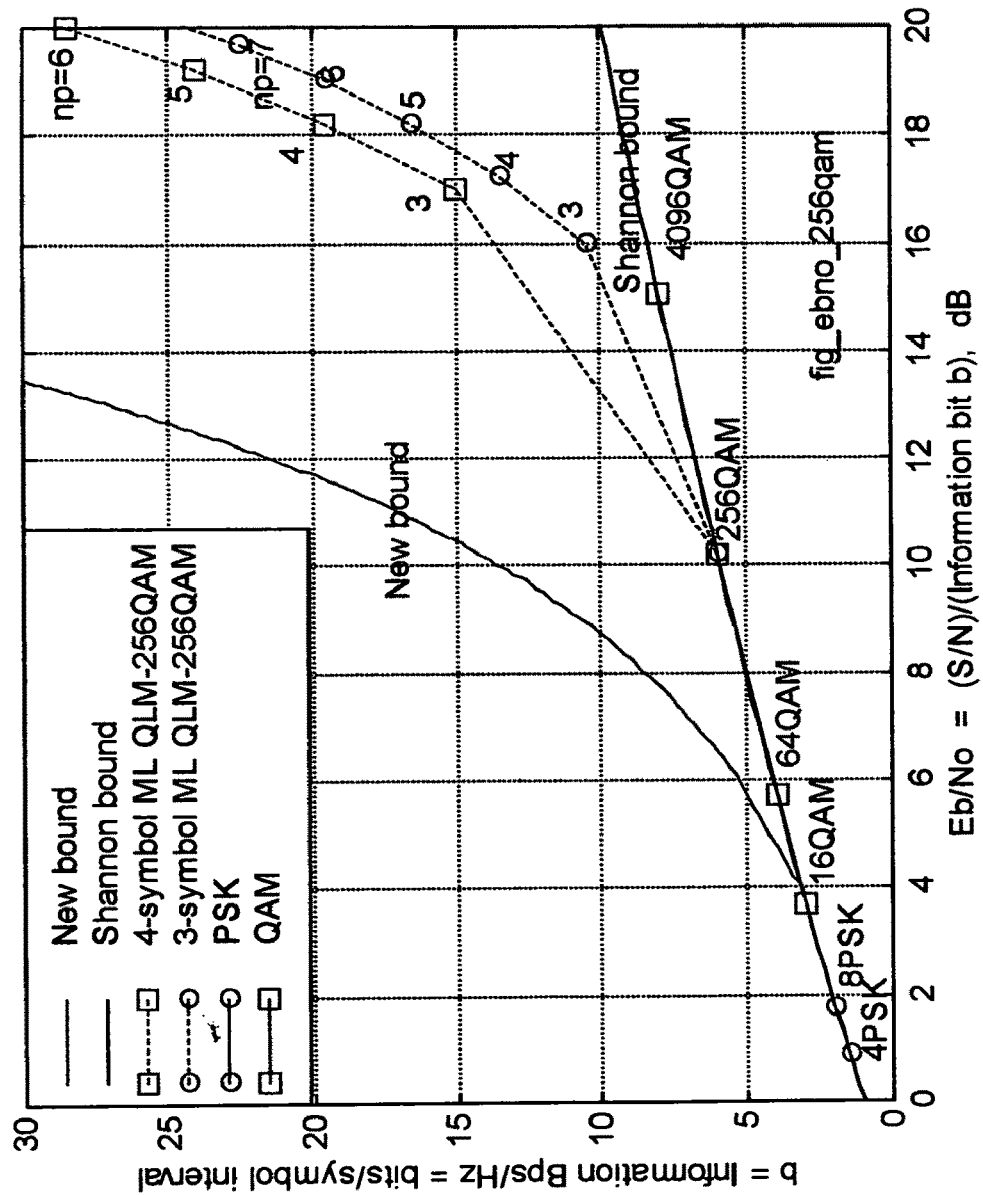
FIG. 11 for the OFDM architecture calculates the information bits b per symbol interval expressed as Bps/Hz versus $E_b/N_o$ for the new bound, Shannon bound, for PSK, QAM with turbo coding to bring the performance to essentially equal to the Shannon bound, and for QLM 3,4-data symbol group performance using 256QAM.
Figure 12:
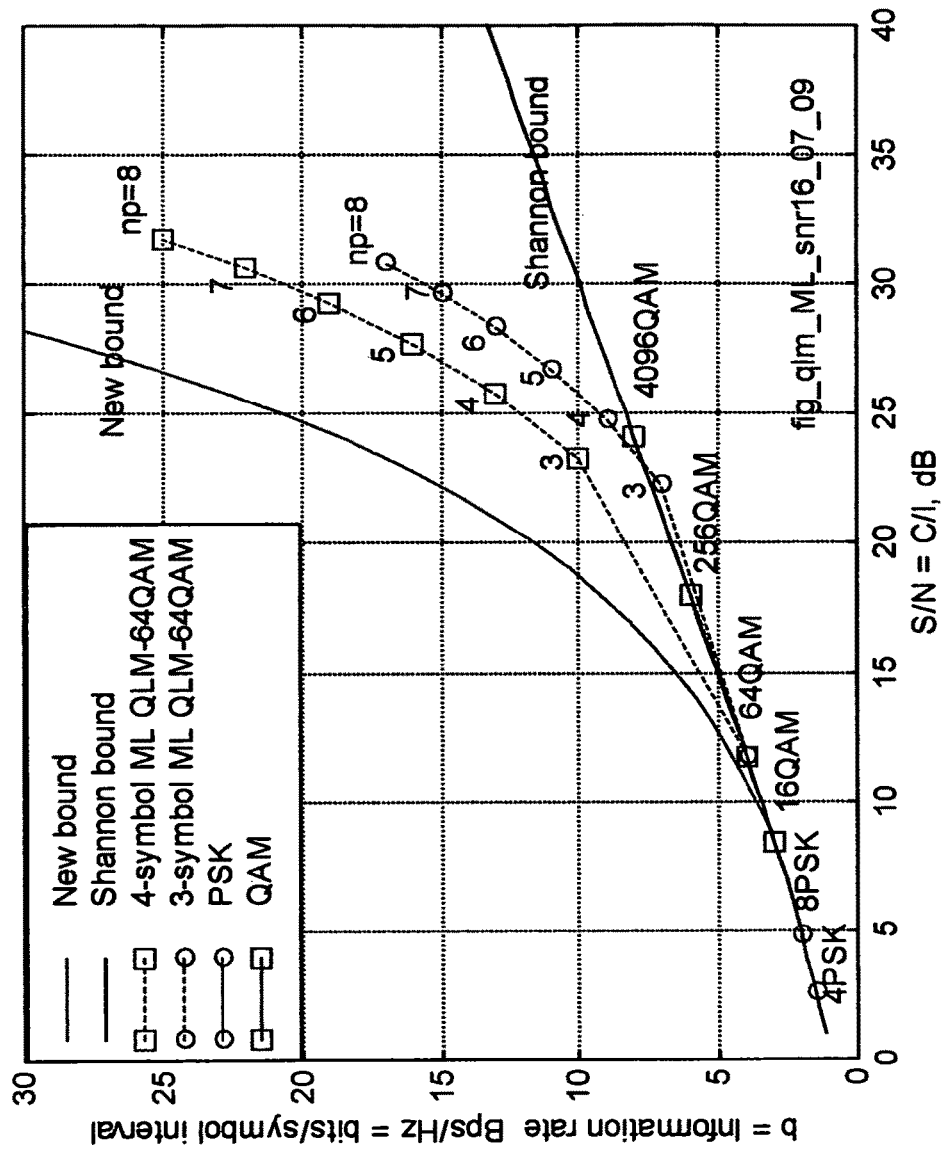
FIG. 12 for the OFDM architecture calculates the information bits b per symbol expressed as Bps/Hz versus S/N=C/I for the new bound, Shannon bound, for PSK, QAM with turbo coding to bring the performance to essentially equal to the Shannon bound, and for QLM 3,4-data symbol group performance using 64QAM.
Figure 13:
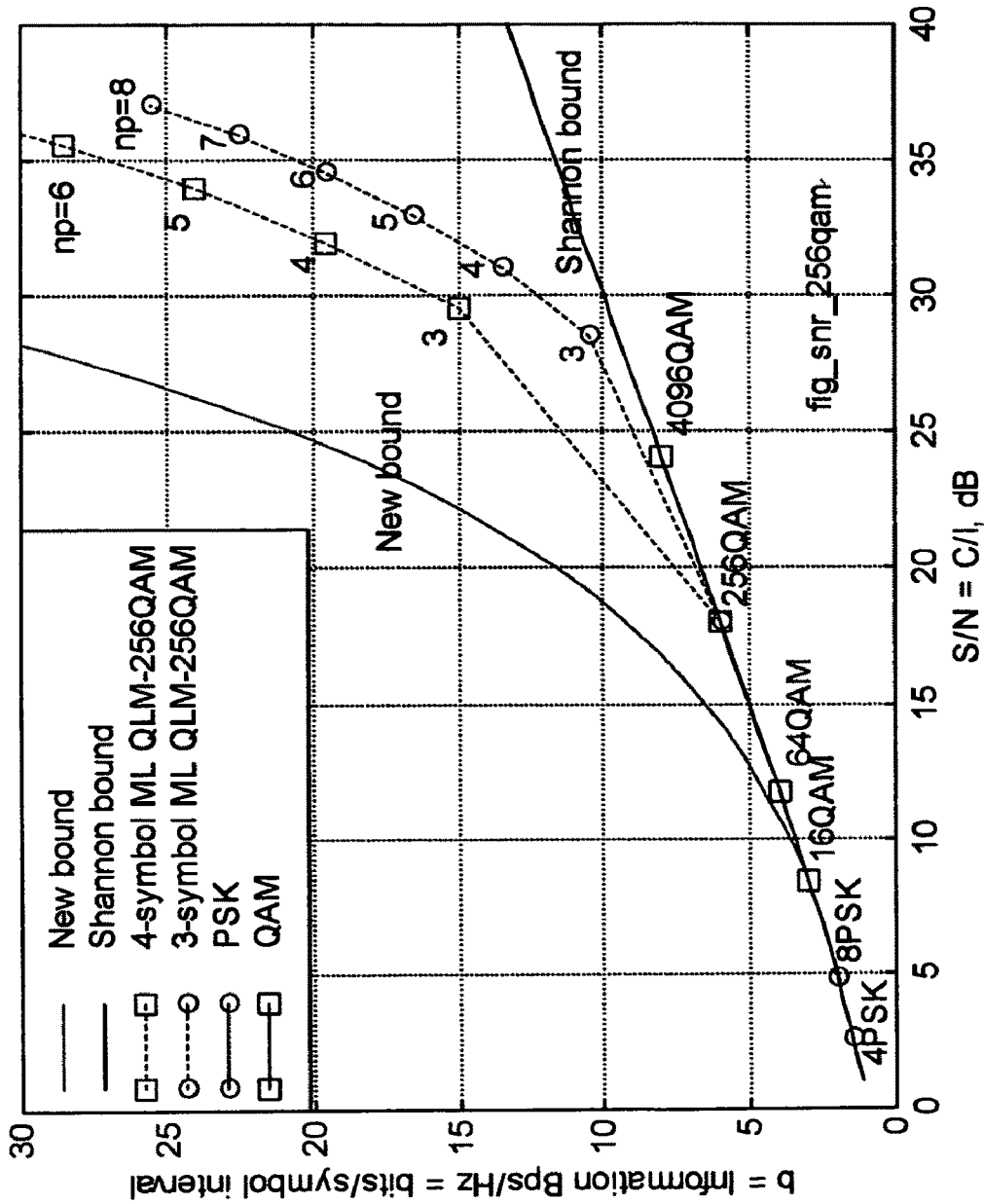
FIG. 13 for the OFDM architecture calculates the information bits b per symbol interval expressed as Bps/Hz versus S/N=C/I for the new bound, Shannon bound, for PSK, QAM with turbo coding to bring the performance to essentially equal to the Shannon bound, and for QLM 3,4-data symbol group performance using 256QAM.

FIGS. 10-13 calculate the OFDM WiFi QLM information rate b Bps/Hz (information bits per data symbol interval $T_s$) performance vs. $E_b/N_o$ and S/N=C/I using the ML BER performance in FIGS. 8,9 measured for the $n_s$=3,4-data symbol architectures in FIG. 7. FIG. 10 calculates the b Bps/Hz vs. Eb/No for $n_s$=3,4-data symbol blocks using QLM-64QAM which reads "modulation 64QAM used for QLM", FIG. 11 calculates the b Bps/Hz vs. Eb/No for $n_s$=3,4-data symbol blocks using QLM-256QAM, FIG. 12 calculates the b Bps/Hz vs. S/N for $n_s$=3,4-data symbol blocks using QLM-64QAM, and FIG. 13 calculates the b Bps/Hz vs. S/N for $n_s$=3,4-data symbol blocks using QLM-256QAM which reads "modulation 256QAM used for QLM". Supporting this performance data are the calculations for the Shannon bound in equations (2) and the new bound in equations (5), and the number of information bits per symbol b=bits=Bps/Hz versus measured $E_b/N_o$, S/N=C/I for 4 PSK, 8 PSK, 16QAM, 64QAM, 256QAM, 4096QAM. The 4 PSK, 8 PSK are 4-phase, 8-phase phase shift keying modulations which respectively encode 2,3 bits per symbol and 16QAM, 64QAM, 256QAM, 1024QAM are 16, 64, 256, 4096 state QAM modulations which respectively encode 4, 6, 8, 12 bits. For no coding the information bits per symbol b is equal to the modulation bits per symbol $b_s$ so that b=$b_s$=2,3,4,6,8,12 bits per symbol=Bps/Hz respectively for 4 PSK, 8 PSK, 16QAM, 64QAM, 256QAM, 4096QAM. Assumed turbo coding performance provides a performance almost equal to the Shannon bound. The assumed coding rates R=3/4, 2/3, 3/4, 2/3, 3/4, 2/3 reduce the information bits per symbol to the respective values b=1.5,2,3,4,6,8 bits=Bps/Hz.

The OFDM WiFi QLM performance calculations in FIGS. 10-13 use the information rates 1, scaling laws 2, and demodulation losses 3 in equations (8). OFDM WiFi QLM data rates 1 are calculated in FIGS. 10-13 for the values of $E_b/N_o$ and S/N calculated in 2 with demodulation losses in 3 subtracted from these calculated values, for $n_p$=1,2,3,4,5,6, 7,8 and QLM data symbol modulation choices.

$$\begin{aligned}
&1\ \text{Information rates for the } n_s = 3, 4-\text{data symbol groups are} \quad (8)\\
&\qquad b = b(QLM)N_s/4\ \text{for } 3, 4-\\
&\qquad \text{data synbol groups wherein}\\
&\qquad N_s = (n_s - 1)n_p + 1 = \text{number of symbols}\\
&\qquad \text{in 4 } \mu s\ \text{data packet}\\
&\qquad b(QLM) = 4\ Bps/\text{Hz for } QLM - 64QAM\\
&\qquad\qquad\qquad = 6\ Bps/\text{Hz for } QLM - 256QAM\\
&\qquad \text{divisor 4 is the number of } WiFi\\
&\qquad \text{data symbol tones being replaced}\\
&\qquad \text{by the } QLM\ 3, 4-\text{data symbol}\\
&\qquad \text{groups}
\end{aligned}$$

2 Scaling laws from equations (3) are $$E_b/N_o = [E_b/N_o] + 10\log_{10}(n_p)$$

$$S/N = [S/N] + 20\log_{10}(n_p)$$

wherein ["o"] is the value of "o" for the communications channel when there is no layering $$\begin{aligned}
&3\ E_b/N_o \text{demodulation loss is}\\
&E_b/N_o\ \text{loss} = -1\ db\ \text{for } 3-\text{data symbol group using } FIG.\ 8\\
&\qquad\qquad\quad = -2\ db\ \text{for } 4-\text{data symbol group using } FIG.\ 9
\end{aligned}$$

OFDM WiFi QLM examples in equations (9) illustrate the performance calculated in FIGS. 10-13 using equations (8). Information rate b in Bps/Hz is calculated for $n_s$=3,4-data symbol blocks for $n_p$=6 layers for QLM using the data symbol modulations 64QAM and 256QAM. A $n_p$=6 layer QLM represents a reasonable implementation with current technology when considering the requirements on time and frequency synchronization and ML demodulation. Also listed are the increase ΔS/N in signal power that is required to support this information rate when compared to the S/N=18 dB required to support the highest WiFi information rate b=6 Bps/Hz using 256 QLM.

1 OFDM WiFi QLM for $n_s = 3$ – data symbol block, $n_p = 6$ layers (9)

$$b = N_s/4x(WiFi \text{ information rate})$$
$$= 3.25x4 = 13 \text{ Bps/Hz}, \Delta S/N = 8.8 \text{ dB},$$
$$QLM - 64QAM$$
$$= 3.25x6 = 19.5 \text{ Bps/Hz}, \Delta S/N =$$
$$16.6 \text{ dB}, QLM - 256QAM$$

2 OFDM WiFi $\hat{QLM}$ for $n_s = 4$ – data symbol block, $n_p = 6$ layers $$b = N_s/4x(WiFi \text{ information rate})$$
$$= 4.75x4 = 19 \text{ Bps/Hz}, \Delta S/N =$$
$$9.8 \text{ dB}, QLM - 64QAM$$
$$= 4.75x6 = 28.5 \text{ Bps/Hz}, \Delta S/N =$$
$$17.6 \text{ dB}, QLM - 256QAM$$

Figure 1:
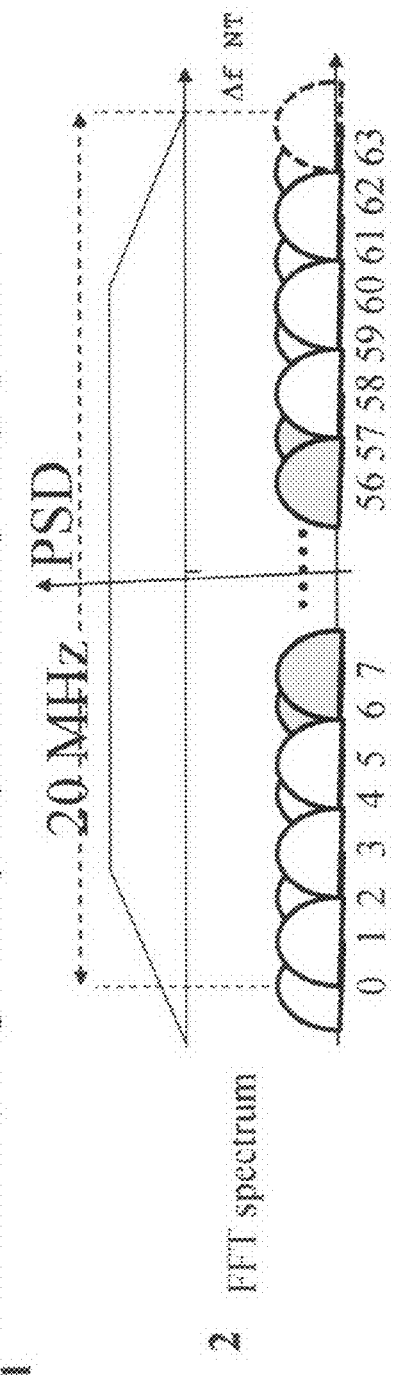
FIG. 1 describes the OFDM waveform for the WIFi standard.

The OFDM WiFi QLM maximum information rate b in equations (9) is listed in 1 in equations (10) and the corresponding Tx maximum data rate $R_b$ vs the WiFi 256QAM maximum data rate is calculated in 2 in equations (10). We find $$QLM - 256QAM \text{ data rate for } 4- \quad (10)$$
$$\text{data symbol group with } n_p = 6 \text{ layers}$$
1) $b = 28.5$ Bps/Hz $vs. WiFi$ 6 Bps/Hz maximum information rate
2) $R_b = 4.75x(WiFi \text{ maximum data rate } 57 \text{ Mbps})$
$$= 271 \text{ Mbps vs. WiFi maximum data rate } 57 \text{ Mbps}$$

wherein the Tx maximum QLM-256QAM data rate $R_b$ in Bps is scaled from the b for the WiFi maximum data rate calculated in 3 in FIG. 1.

Figure 14:
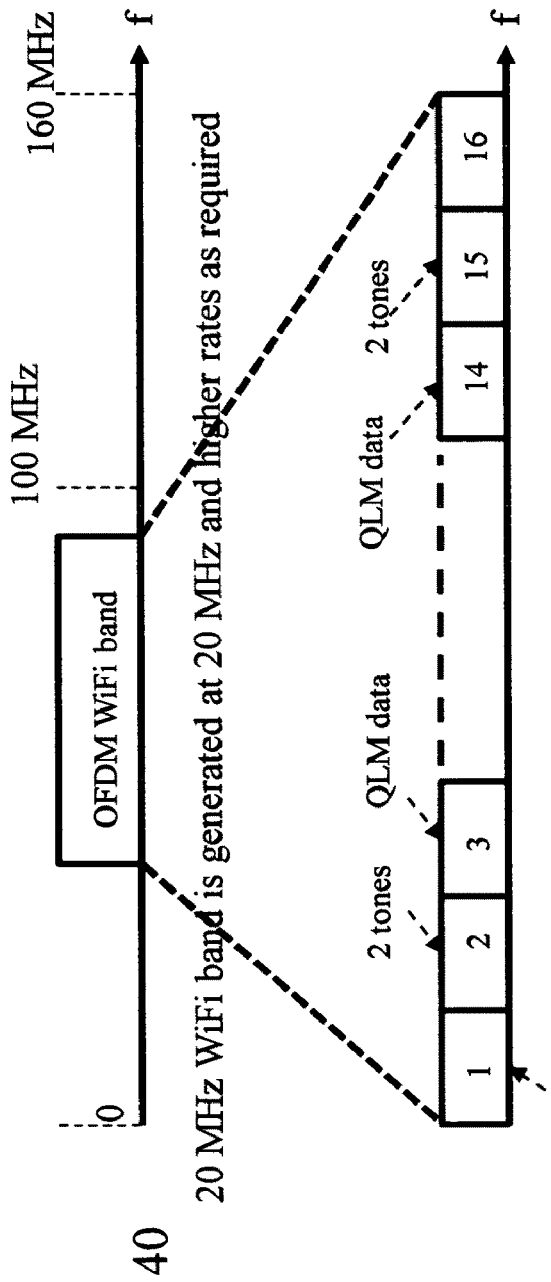
FIG. 14 describes the partitioning of the OFDM WiFi standard 20 MHz band into 16 OFDM WiFi QLM subbands.

FIG. 14 starts implementation of the OFDM WiFi QLM representative architecture with the generation of the subband filters by a computationlly efficient N-point pre-weighted $FFT^{-1}$ algorithm. The 20 MHz WiFi band 40 is partitioned into a 16 subband filters 41 which are labeled form 1 to 16. Subbands 3-14 occupy the WiFi 48 data tone frequency band and each subband filter occupies a 4-tone WiFi frequency slot which means each subband filter occupies a frequency band=4/3.2 μs=1.25 MHz and transmits a OFDM WiFi QLM data signal every $T_s$=3.2 μs/4=0.8 μs when transmitting at the Nyquist rate 1/$T_s$. The N can be equal to 16 or could be considerably larger if is necessary to generate more than 16 digital samples per symbol length in order to generate a number >16 which has a divisor equal to the $n_p$ of interest so that the timing for each layer falls on a digital sample. Subbands 2 and 15 each transmit the WiFi 2-tones at the edges of the data tone band. OFDM WiFi QLM architecture definitions include the following:

$$x(s|k) = \text{data symbol } s \text{ for state } s \text{ for subband } k \quad (11)$$

$n = 1, 2, \ldots, n_p$ index over the $n_p$ layers $n_s$ = number of data symbols in the ground layers $n = 1$ Data block = block = $N$ – point $FFT^{-1}/FFT$ data processing block $= T_s = NT = 0.8\mu s$ separation between symbols within each layer $1/T = N/T_s$ = digital sample rate = digital clock rate $= 20$ and $30$ Mhz options for $FFT^{-1}, FFT$ $s = 1, 2, \ldots, N_s$ data symbol index = state index over $N_s = (n_s - 1)n_p + 1$ $k = 0, 1, \ldots, N - 1$ frequency subband index in the $N$ – point $FFT^{-1}$ and $FFT$ $= 1, 2, \ldots, 12$ subband frequency index for the

OFDM WiFi QLM subbands wherein the definition of the frequency index $k$ is determined by the application $\psi$ = data symbol $x(s|k)$ waveform represented by the example in FIG. 5

= real symmetric finite impluse response in time which is *a* Wavelet waveform or equivalent suitable for the $FFT^{-1}$ and $FFT$ subbands $i_0 = 0, 1, 2, \ldots, N - 1$ sample index over data block for the $N$ – point $FFT^{-1}$ and $FFT$ $i = 0, 1, 2, \ldots, 4 \mu s\ T - 1$ sample index and clock over the $4\ \mu s$ data packet $= 80, 120$ digital sample (digital clocks) for $20, 30$ MHz $= 1/T$ $= i_r + (s-1)N/n_p + \Delta(s)N = i_0$ for indexing over data symbol $s$ waveform $\psi$ $i_r$ = start index for 3, 4 – data symbol group waveform in FIG.7 wherein the next index value is the peak of data symbol $s = 1$ waveform $\psi$ in FIG. 5

$(s-1)N/n_p$ = offset of the start of the data symbol $s$ waveform $\psi$ referenced to the peak value of $\psi$ as shown in FIG. 5, 7

$\Delta(s)$ = data block offsets of the data symbol $s$ waveform $\psi$ relative to the reference block corresponding to $\Delta(s) = 0$ which value is 16 in FIG. 5 and block 2 FIG. 7

= offset to specify the $\psi$ waveform indexed by $i_0$ for processing over *a* data block Consider the generation of a data symbol x(s|k) waveform encoded baseband signal $z(i_0|s, \Delta)$ for state s=signal s for processing block $\Delta$ and for all of the subbands k. We find $z(i_0|s, \Delta)=[1 \times N]_s$ baseband signal vector indexed on $i_0$ in block $\Delta$ of (12) the waveform $\Psi$encoded data symbols x(s|k) for all k wherein w is a real symmetric Wavelet or equivalent waveform impulse response suitable for post-weighted $FFT^{-1}$ subband data-filter waveforms $$z(i_0|s, \Delta) = [1 \times N]_s \text{ baseband signal vector indexed on } i_0 \text{ in block} \quad (12)$$

$\Delta$ of the waveform $\psi$ encoded data symbols $x(s|k)$ for all $k$ wherein $\psi$ is a real symmetric Wavelet or equivalent waveform impulse response suitable for post-weighted $FFT^{-1}$ subband data-filter waveforms $= N^{-1} \Sigma_k \, x(s|k) \psi(i_0 + i_r + (s-1)N/n_p + \Delta(s)N|k)$ using the definitions in equations (11), (13)

$= N^{-1} \Sigma_k \, x(s|k) E^*(k, i_0) \psi(i_0 + i_r + (s-1)N/n_p + \Delta(s)N)$ using the definition of $\psi$ in equations (11), (13)

$= FFT^{-1}\{x(s|k)\} \psi(i_0 + i_r + (s-1)N/n_p + \Delta(s)N)$ using the definition of $FFT^{-1}$ in equations (13)

which is a computationally efficient post-weighted $FFT^{-1}\{x(s|k)\}$ that calculates a $[1 \times N]_x$ row vector indexed on $i_0$ and with each element $i_0$ multiplied by the corresponding element $\Psi(i_0+i_r+(s-1)N/n_p+\Delta(s)N)$ of the $[1 \times N]_\Psi$ post-weighting $\Psi$ row vector. It is convenient to use vector and matrix notation in order to map these algorithms into hardware chips. Definitions used are defined in equations (13).

$$FFT^{-1}\{x(s|k)\} = N^{-1} \sum_k x(s|k) \, E*(k, i_0) \text{ by definition using the inverse} \quad (13)$$

discrete fourier transform $DFT^{-1}$ equivalent of the $FFT^{-1}$ $= [1 \times 12][12 \times N]$ multiplication of the $[1 \times 12]$ row vector $x(s|k)$ for the 12 subbands $k$, by the $[12 \times N]$ $DFT^{-1}$ matrix $= [1 \times N]_x$ row vector indexed on $i_0$ $[1=N]_\Psi$ = post-weighting $\Psi$ row vector indexed on $i_0$ with elements $\Psi(i_0+i_r+(s-1)N/n_p+\Delta(s)N)$ $\psi(i_0 + i_r + (s-1)N/n_p + \Delta(s)N \,|\, k)$ = waveform $\psi$ for subband $k$ $= E*(k, i_0)\psi(i_0 + i_r + s - 1)N/n_p +$ $\Delta(s)N)$ since the baseband $\psi$ is frequency translated to subband $k$ $E(k, i_0) = \exp(-j2\pi k i_0/N)$ $=$ element $k$, $i_0$ of the $[N \times N]$ $DFT$ matrix and $E*(k, i_0)$ is the complex conjugate of $E(k, i_0)$, harmonic index $k = 0, 1, \ldots, N-1$, and time index $i_0$ FIG. 15 constructs the Tx baseband signal z(i) row vector $[1 \times 5N]_z$ wherein the number of indices of clocks in the 4 μdata packet is equal to N in each of the 5 blocks, using the implementation of the computationally efficient post-weighted $FFT^{-1}$ algorithm to generate the subband QLM data symbols $z(i_0|s; \Delta)$ in equations (12),(13) for each s. Four implementation steps are used to generate the Tx $[1 \times 5N]_z$ baseband signal vector z(i). Step 1 in 11 starts the implementation by calculating $FFT^{-1}\{x(s|k)\} = [1 \times N]_x$ row vector indexed on $i_0$ in equations (13) for each s.

Step 2 in 12 calculates the Matlab element-by-element product "*" of the $[1 \times N]_x$ row vector in step 1 with the $[1 \times N]_\Psi$ row vector whose elements are the $\Psi$ values $\Psi(i_0+i_r+(s-1)N/n_p+\Delta(s)N)$ defined in equations (13), to implement the computationally efficient post-weighted $FFT^{-1}$ algorithm in equations (12) to calculate the $[1 \times 5N]_s$ row vector $z(i_0|s, \Delta)$.

Step 3 in 13 unfolds the baseband waveform $z(i_0|s, \Delta)$ over all of the data processing blocks $\Delta$ and adds zeros at both ends to expand the baseband waveform to fill the OFDM WiFi QLM 4 μs data packet with the resultant $[1 \times 5N]_s$ baseband vector z(i|s) which is the Tx signal for state s symbol s indexed by I over the 4 μs data packet. Vector unfolding as described in 13 consists of applying the Matlab operation of forming the $[1 \times 5N]_s$ vector by first laying out the $[1 \times N]_s$ vectors $z(i_0|s, \Delta)$ for all data processing blocks $\Delta$ and than adding zero row vectors z(start) and z(finish) if necessary to complete the $[1 \times 5N]$ 4 μs data packet vector z(i|s) for state s symbol s.

Step 4 in 14 is the final step in the implementation and generates the Tx $[1 \times 5N]_z$ baseband signal vector z(i) for all of the states s and signals s over the 4 μs OFDM WiFi QLM data packet by vector addition of the $[1 \times 5N]_s$ vectors z(i|s) over all values of state s symbol s.

The computationally complexity of the pre-weighted $FFT^{-1}$ algorithm including the addition of the vectors over the states and signals to generate z(i) in Step 4 is the following wherein $M = \log_2(N)$. We find Real multiplies $R_M$    $R_M = N_s(2MN + 2LN)$      (14)

Real adds $R_A$    $R_A = N_s(3MN + 2LN) + (N_s - 1)2LN$

The N-point post-weighted $FFT^{-1}$ for Tx and pre-weighted FFT for Rx have nominal values equal to N=16 which yields a 20 MHz digital sample (clock rate) equal to the WiFi 20 MHz band and N=16 digital samples over the data symbol interval and which supports a layering menu $n_p$=1,2,4,8 since these integers are divisors of N=16. To increase the menu to $n_r$=1,2,3,4,6,8 requires N=24 which yields a 30 MHz clock rate and N=24 digital samples over the data symbol interval and allows the integers in the increased menu to be divisors of N=24. Higher values of N are required to add $n_p$=5,7 values to the menu.

Rx demodulation of the received Tx signal z(i) row vector $[1 \times 5N]$ plus noise starts by using pre-weighted FFT subband detection filters to recover the correlated data symbol estimates in the Tx signal plus noise at the clock intervals $N/n_p$ for the 3,4-data symbol groups layered with QLM communications channels in FIG. 7. This pre-weighted FFT subband detection filter bank implements a convolution of the complex conjugate $\Psi^*$ of the Tx waveform $\Psi$ in each of the subbands k at the clock intervals $N/n_p$, with the received Tx signal z(i) to provide an optimal detection which maximizes the S/N=C/I.

The correlated signals recovered by the pre-weighted FFT subband detection filters are characterized by the correlation coefficients {h(s, s')} wherein s is the reference data symbol for state s which in our application are the data signals correlated with the transmitted data signals s' at the clock intervals $N/n_p$. There are $N_s=(n_s-1)n_p+1$ QLM data symbols transmitted over each subband of the WiFi 4 μs packet and for both Tx and Rx signal processing it is convenient to number them in the order they are received using the signal index s for state index s in equations (11).

The correlation coefficients h(s,s') are evaluated starting with the definition of the data symbols x(s|k), x(s'|k) waveforms using the definitions in equations (11),(13). We find $$\psi(i_0 + i_r + (s-1)N/n_p + \Delta(s)N|k) = x(s|k) \text{ waveform} \quad (15)$$

$$\psi(i_0 + i_r + (s'-1)N/n_p + \Delta(s')N|k) = x(s'|k) \text{ waveform}$$

The correlation coefficient h(s,s') between data symbol x(s|k) and data symbol x(s'|k) in the same subband k is by definition equal to $$h(s, s') = \sum_{i0} \sum_{\Delta(s)} \psi*(i_0 + i_r + (s-1)N/n_p + \Delta(s)N | k)\psi(i_0 + i_r + \quad (16)$$

$(s'-1)N/n_p + \Delta(s')N | k)$ wherein the convolution has been replaced by correlation since the $\psi$ is symmetric $$= \sum_{i0} \sum_{\Delta(s)} \psi*(i_0 + i_r + (s-1)N/n_p + \Delta(s)N)\psi(i_0 + i_r +$$

$(s'-1)N/n_p + \Delta(s')N)$ since $E*(k, i_0)E(k, i_0) = 1$ and $\psi$ is real and symmetric $$= \sum_i \psi(i)\psi(i + (s-s')N/n_p + (\Delta(s) - \Delta(s'))N)$$

which is an equivalent expression using index $i$ over 4 μs data packet wherein the correlation coefficients h(s,s') are the row s and column s' elements of the $[N_s \times N_s]_h$ correlation matrix H=[h(s,s')].

The computationally efficient pre-weighted FFT subband filters detect y(s|k) for state s in all of the subbands k by convolving the complex conjugate of the waveform of data symbol x(s|k) at state s in the receiver with the Rx waveform z(i) in FIG. 7. We find $$y(s|k) = \sum_{i0} \sum_{\Delta(s)} z(i_0 + i_r + (s'-1)N/n_p + \Delta(s')N)\psi*(i_0 + i_r + \quad (17)$$

$(s-1)N/n_p + \Delta(s)N | k)$ $$= \sum_{i0} \sum_{\Delta(s)} z(i_0 + i_r + (s'-1)N/n_p + \Delta(s')N)\psi(i_0 + i_r +$$

$(s-1)N/n_p + \Delta(s)N)E(k, i_0)$

-continued $$= FFT\{[\sum_{\Delta(s)} z(i_0 + i_r + (s'-1)N/n_p + \Delta(s')N)\psi(i_0 + i_r +$$

$(s-1)N/n_p + \Delta(s)N)]\}$ $$= FFT\{Pre - Sum\}$$

wherein $$Pre - Sum = [\sum_{\Delta(s)} z(i_0 + i_r + (s'-1)N/n_p + \Delta(s')N)\psi(i_0 + i_r +$$

$(s-1)N/n_p + \Delta(s)N)]$ $$= \sum_{s'} h(s, s')x(s'|k) + \text{noise using equation (16)}$$

$$= x(s|k) + [\sum_{s'} h(s, s')x(s'|k)]_{\text{for } s' \neq s} + \text{noise and}$$

which is allowed since $h(s, s) = 1$ because $\psi$ is normalized $\sum_i \psi(i)\psi(i) = 1$ wherein the pre-sum is a $[1 \times N]_p$ vector indexed on $i_0$ and the FFT of the pre-sum in equations (17) is a computationally efficient pre-weighted (pre-summed) FFT set of detection filters which calculate the $[1 \times 12]_y$ vector whose elements are y(s|k) for k=1, 2, . . . , 12 subbands by the matrix operation $[1 \times N]_p[N \times 12] = [1 \times 12]_y$ wherein $[N \times 12]$ is the DFT matrix equivalent of the FFT.

FIG. 16 demodulates the Rx baseband signal z(i) row vector $[1 \times 5N]_z$ plus noise to recover the Rx estimates of the Tx data symbols x(s|k). Five implementation steps are used to recover the Rx estimates of x(s|k) starting with Step 1 in 21 which calculates the $[1 \times N]_p$ pre-sum complex vector indexed on $i_0$ for state s symbol s in equations (17).

Step 2 in 22 calculates the FFT of this pre-sum vector to implement the computationally efficient pre-weighted FFT which generates the $[1 \times 12]_y$ correlated signal vector y(s)=[y(s|k=1) y(s|k=2) . . . y(s|k=12)] by the equivalent DFT $[N \times 12]$ matrix multiplication $[1 \times N]_p[N \times 12] = [1 \times 12]_s$, on the $[1 \times 1N]_p$ pre-sum vector in step 1.

Step 3 in 23 repeats steps 1 & 2 for all of the states s=1, 2, . . . , $N_s=(n_s-1)$ $n_p+1$ to generate the $[N_s \times 12]$ correlated signal matrix Y with $[1 \times 12]_y$ row vectors y(s) for each row s and $[N_s \times 1]$ column vectors y(k)=[y(s=1|k); y(s=2|k); . . . ; y($N_s$|k)] for each column k using Matlab operations to generate this column vector Step 4 in 24 calculates the computationally efficient solution of the ML equation for each column y(k) of Y by solving x(k)=y(k) in 4 in equations (7) for the $[N_s \times 1]$ column vector x(k)=[x(s=1|k); x(s=2|k); . . . ; x(s=$N_s$|k)] using Matlab operations to construct the column vector whose elements x(s|k) are the Rx estimates for data symbol s for subband k.

Step 5 in 25 recovers the data words for each estimate x(s|k) and soft-decision decodes the data word bits to recover the information bits in each data word.

The computational complexity of the pre-weighted FFT algorithm for the 4 μs packet is the Following wherein $M=\log_2(N)$. We find $$\text{Real multiplies } R_M \quad R_M = N_s(2\ MN + 2LN) \quad (18)$$

$$\text{Real adds } R_A \quad R_A = N_s(3\ MN + 2LN)$$

It is well known that the ML solution has a fast algorithm whose computational complexity is estimated to be $$\text{Real multiplies } R_M \quad R_M = 24\ M_s N_s \quad (19)$$

$$\text{Real adds } R_A \quad R_A = 36\ M_s N_s$$

wherein $M_s=\log_2(N_s)$ and taking into account the number of subbands equal to 12. For a fast algorithm to apply it is necessary to remove one symbol from the n=1 ground layer in order to make the number of symbols in a 4 μS packet equal to a product of primes rather than a single prime.

Jensen's inequality from "Mathematical Statistics" by Fergeson, Academic Press, 1967 is a fundamental lemma and when applied to OFDM WiFi QLM proves that a uniform spreading of the Tx signals using multi-scale MS encoding of each QLM layer of communicatons provides the best communications BER performance. This means that there are no other coding or spreading schemes for WiFi which can improve the BER performance provided by MS OFDM WiFi QLM. MS encoding spreads each data symbol over each 4 μs packet in each subband and simultaneously over all of the subbands. This MS OFDM WiFi QLM mode is disclosed using a representative implementation with complex Walsh CDMA codes and generalized complex Walsh CDMA codes and equally applies to all orthogonal and semi-orthogonal spreading codes.

FIG. 17 discloses a complex Walsh code and a generalized complex Walsh code which are used to implement the MS OFDM WiFi QLM mode. The complex Walsh will also refer to the generalized complex Walsh. An example of the complex Walsh code disclosed in U.S. Pat. No. 7,277,382, U.S. Pat. No. 7,352,796 is defined in FIG. 17 which defines 150 the complex N chip Walsh code vector W(c) indexed on c=0, 1, ..., N-1 as a linear sum of the real code vector W(cr) lexicographically reordered by the index cr and the real code vector W(ci) used as the complex orthogonal component lexicographically reordered by the index ci and wherein the notation 1:N/2 is the Matlab notation for indexing 1, 2, 3 ..., N/2. This reordering of the even and odd Walsh vectors to yield the complex Walsh code vectors is in 1-to-1 correspondence with the generation of the complex discrete Fourier transform DFT codes by the reordered even and odd real DFT codes used for the real and imaginary complex DFT code components. An 8×8 complex Walsh code matrix $W_8$ in 151 is rotated by 45 degrees so the axes are aligned with the complex coordinates. The generalized complex Walsh 154 is a tensor product with one or more orthogonal matrices which include the discrete fourier transform (DFT), real Walsh, complex Walsh, and other codes. A motivation for the generalized Walsh is to obtain complex orthogonal codes with a greater flexibility in choosing the length N.

Figure 18:
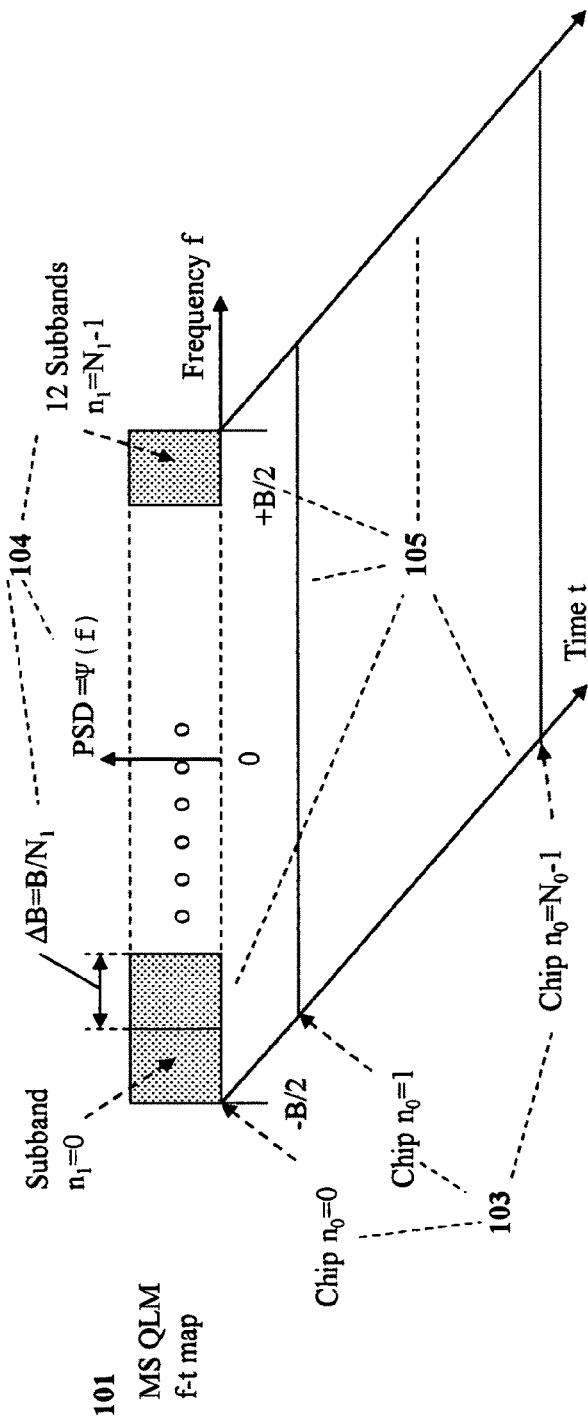
FIG. 18 describes the multi-scale MS encoding of each layer of OFDM WiFi QLM which spreads each data symbol vector within the subbands and over the subbands.

FIG. 18 discloses an MS OFDM WiFi QLM code using complex Walsh codes and generalized complex Walsh codes and other codes. The MS coding is disclosed in U.S. Pat. No. 7,394,792 and for QLM layer n=1, 2, ..., $n_p$ in 101, MS maps the encoded OFDM WiFi QLM chips for layer n onto the QLM frequency-time "f-t" communications space 105 by partitioning 105 the WiFi band into $N_1$=12 subbands 104 using an orthogonal Wavelet filter bank or an equivalent filter bank and by mapping each data symbol over the $N_1$ subbands 104 and over the $N_0$ chips 103 in each subband. For layers n>1 the number of chips is $N_0=n_s-1$ and for the ground layer n=1 the number of chips is $N_0=n_s$ or $N_0=n_s-1$ if the last chip is deleted in order to support a fast algorithm for ML demodulation. Power spectral density PSD is plotted in 104 to illustrate the partitioning into $N_1$=12 subbands. Parameters and coordinates in 102 are the number $N_0=N_0N_1$ of MS chips, MS chip index $n_p$ over the chips 103 in each subband, MS chip index $n_1$ over the subbands 104, and MS code index $n_c$. Index algebraic fields start with "0" and the layering index over $n_p$ layers starts with the ground layer n=1. MS code and chip indexing in 102 illustrates the construction of an MS code index as the scaled algebraic sum of the algebraic index fields for the user and chip indices over the communication elements being encoded. In this example the communication elements are the frequency band, individual subbands, and 4 μs data packet. This algebraic architecture spreads each user data symbol uniformly over each member of each set of communication elements thereby satisfying Jensen's inequality to guarantee the best communications performance. The same construction is used for all of the QLM layers.

In the MS OFDM WiFi QLM mode the transmit data symbols x(s|n, ∀ k) in each layer n are generated by encoding the transmit data symbols x(u|n) with the [$N_c \times N_c$] MS code matrix $C=[C(u_0+u_1N_0, n_p+n_1N_0)]$ prior to the transmit signal processing in FIG. 15 and in equations (12), (13) which implements a post-weighted $FFT^{-1}$ of these MS encoded data symbols to generate the baseband OFDM WiFi QLM signal z(i).in step 4 in FIG. 15. Element $C(u_0+u_1N_0, n_p+n_1N_0)$ is the element of C at row $u_0+u_1N_0$ and column $n_p+n_1N_0$, column index $n_p+n_1N_0$ is the code index defined in FIG. 18, and user row index $u_0+u_1N_0$ has the same algebraic structure as the code index. Symbol "∀k" reads "for all subbands k used by QLM data symbols". The set of transmit data symbols x(s|k, n) in layer n in subband k after MS encoding consists of the data symbols s=1, 2, ..., $n_s$ for layer n=1 or s=1, 2, ..., $n_s-1$ if the last symbol is deleted to support a fast ML demodulation algorithm and the data symbols s=1, 2, ..., $n_s-1$ for layer n>1. The transmit data symbols x(s|n,k) in each layer n are generated by the MS encoding in equation (20) of the data symbols x(u|n) for u in layer n and which are prior to the MS encoding.

$$x(s = n_0 + 1 \mid n, k = n_1 + 1) = \sum_u x(u \mid n) C(u_0 + u_1 N_0, n_0 + n_1 N_0) \quad (20)$$

$$= MS \text{ encoded transmit data symbol}$$

$$s = u_0 + 1 \text{ in subband } k = u_1 + 1$$

$$\text{transmit } MS \text{ data symbol } s \text{ in layer}$$

$$n \text{ of subband } k$$

Received estimates of the transmit data symbols x(s=$n_0$+1|n, k=$n_1$+1) in each layer n are MS decoded in equation (21) to generate the estimates x(u|n) of the data symbols for u in layer n and prior to MS encoding in the transmitter. We find $$x(u|n) = N_c^{-1} \sum_{n0,n1} x(s = n_0 + 1 | n, k = n_1 + 1)C*(u_0 + \quad (21)$$

$$u_1 N_0, n_0 + n_1 N_0)$$

$= MS$ decoding of received data symbol $s = u_0 + 1$ in subband $k = u_1 + 1$ $=$ receive $MS$ decoded data symbol for $u$ for layer $n$ using the orthogonality property of C $N_c^{-1} \Sigma_{n0,n1} C(u_0 + u_1 N_0, n_0 + n_1 N_0) C*(u_0 + u_1 N_0, n_0 + n_1 N_0)$
$= \delta(\underline{u}, u)$ wherein $C* =$ complex conjugate transpose of $C$ $\delta(\underline{u}, u) = 0$ for $\underline{u} \neq u$, delta function $\quad = 1$ for $\underline{u} = u$ $\underline{u} = u_0 + u_1 N_0$ Transmitted data symbols x(u|n) for the MS OFDM WiFi QLM mode are the transmitted data symbols x(s|k) for the OFDM WiFi QLM mode with the equivalence that user indices $u_0=0, 1, \ldots, N_0-1$ and $s=1, 2, \ldots, N_0$ refer to the same data symbols, and $k=1, 2 \ldots, N_1$ refer to the same data symbols, and the MS encoding mode is implemented before the transmit signal processing in FIG. 14 and in equations (11)-(13) and the MS decoding mode is implemented after the receive signal processing in FIG. 15) and in equations (15)-(17) and which means the MS mode does not impact this transmit and receive signal processing for OFDM WiFi QLM. Fast MS encoding and MS decoding algorithms are available and have the computational complexity Real multiplies $R_M$ $\quad R_M = n_p 2 M_c N_c$ $\quad$ (21)

Real adds $R_A$ $\quad R_A = n_p 3 M_c N_c$ wherein $M_c = \log_2(N_c)$ and $N_c = n_s - 1$ for $n > 1$ and for $n = 1$ assuming $N_c = n_s - 1$ which corresponds to neglecting the last symbol order to have a fast algorithm for all n.

Figure 19:
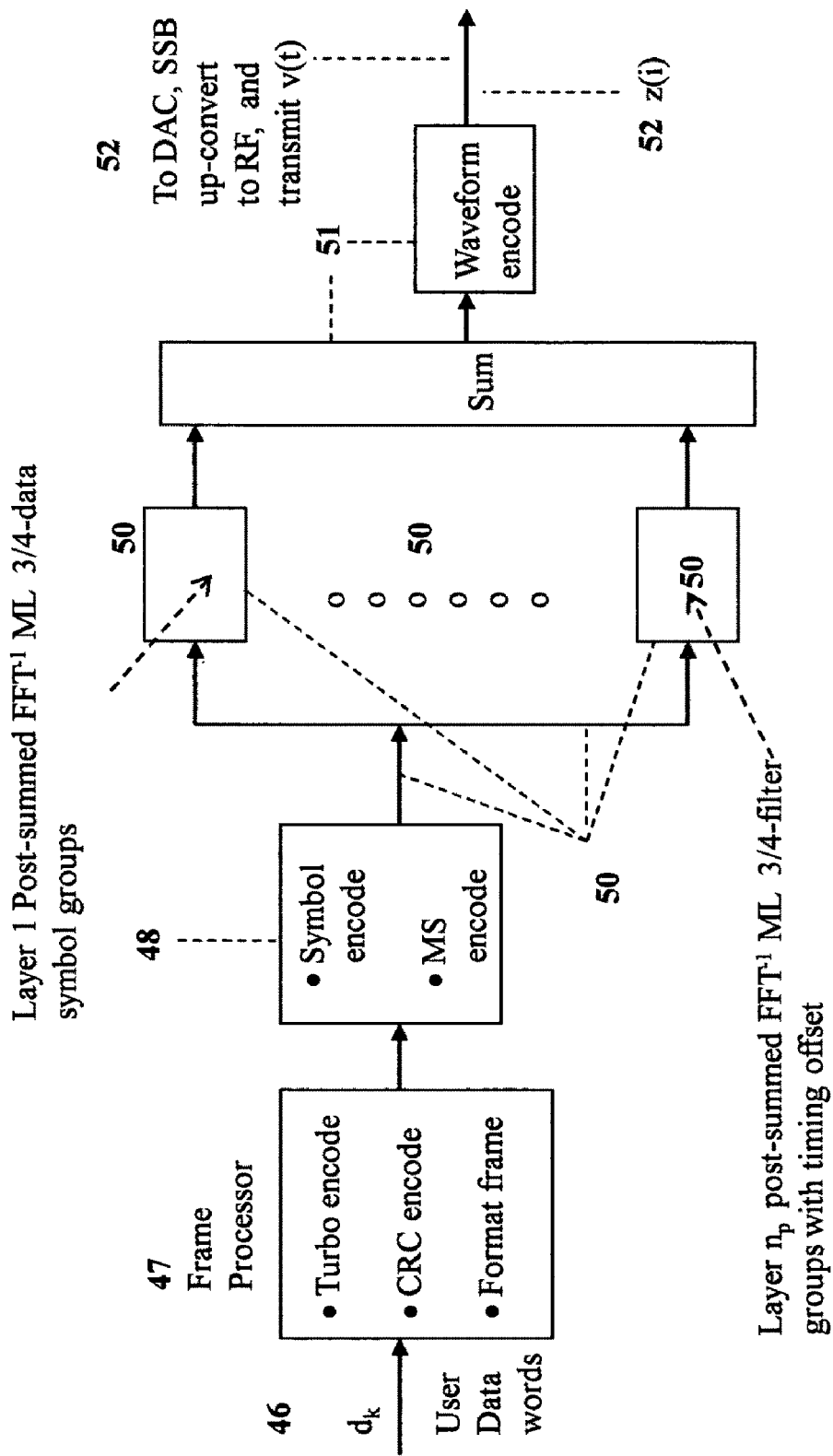
FIG. 19 is a representative transmitter implementation block diagram for the OFDM WiFi QLM mode.

FIG. 19 is a WiFi transmitter block diagram modified to support a MS OFDM WiFi QLM mode using ¾-data symbol groups to increase the symbol transmission rate and with an increase in transmitter power to support this increased data rate. The WiFi standard power spectrum in FIG. 1 is modified by the OFDM WiFi QLM mode signal processing defined in FIGS. 7,14,15 when the ML demodulation is implemented. Signal processing starts with the stream of user input data words $d_k$ 46 with k indexed over the words. Frame processor 47 accepts these data words and typically performs turbo error correction encoding, error detection cyclic redundant coding CRC, frame formatting, and passes the outputs to the symbol encoder 48 which encodes the frame data words into data symbols and prior to handover to the signal processing 50 the data symbols are encoded with multi-scale encoding MS in FIG. 16 using generalized complex Walsh codes in FIG. 17 or other orthogonal and quasi-orthogonal codes.

Signal processing 50 in FIG. 19 implements the ML OFDM WiFi QLM mode signal generation in FIG. 7, 14-15 for the $n_p$ QLM layers. The QLM ML signals for each layer is offset in time in each subband filter in 50, are summed in 51 and waveform encoded in 51, the output stream of complex baseband signal samples 52 z(i) defined in 14 in FIG. 15 is handed over to the digital-to-analog converter DAC which generates the analog equivalent z(t) of the z(i), and the DAC output analog signal z(t) is single sideband SSB up-converted 52 to RF and transmitted as the analog signal v(t) wherein v(t) is the real part of the complex baseband signal z(t) at the RF frequency.

FIG. 19 applies to the OFDM WiFi QLM mode in the absence of MS encoding by deleting the MS encoding in 48.

Figure 20:
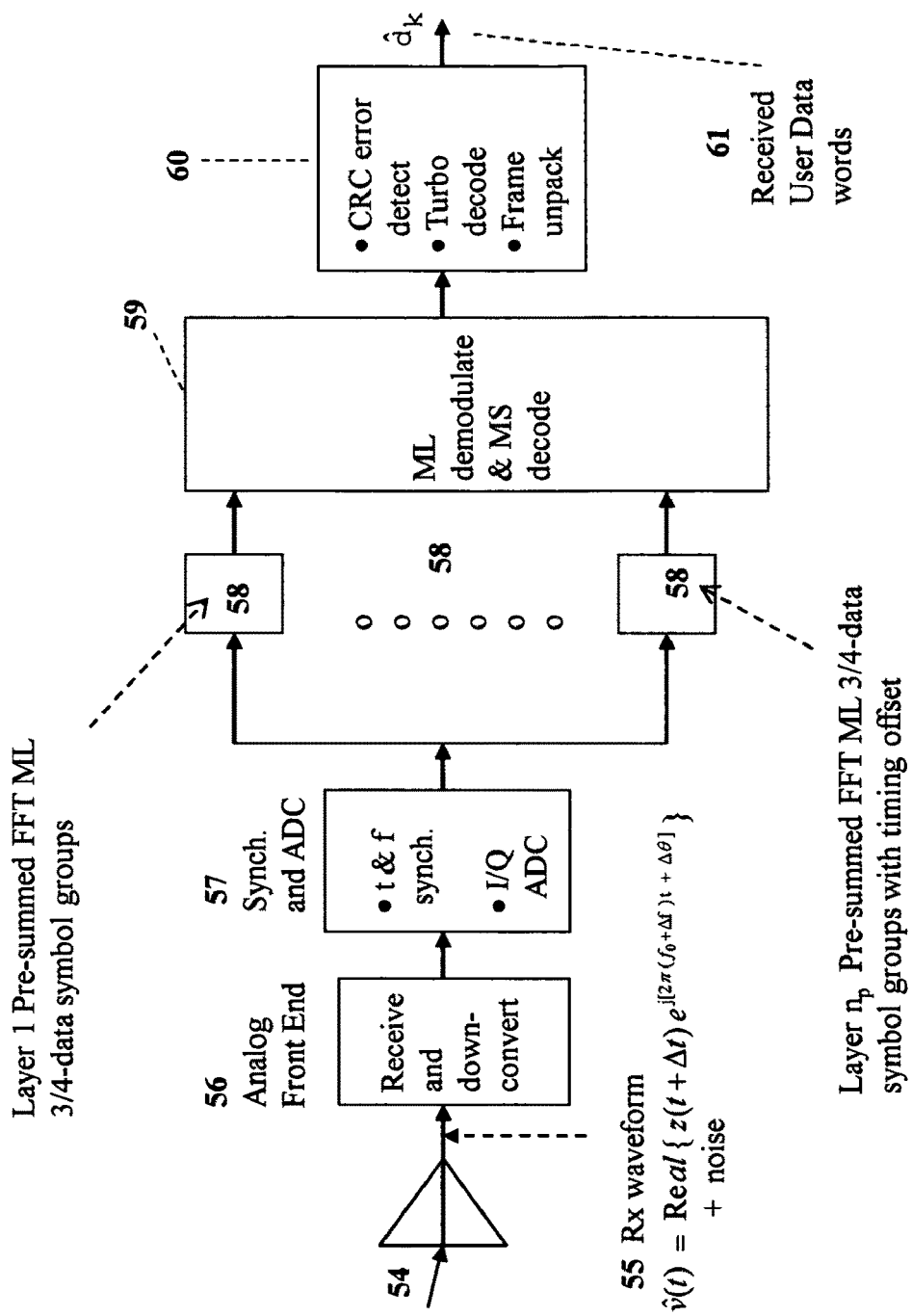
FIG. 20 is a representative receiver implementation block diagram for the OFDM WiFi QLM mode.

FIG. 20 is a WiFi receiver block diagram modified to support a MS OFDM WiFi QLM communications signal from the MS OFDM WiFi QLM transmitter in FIG. 19. Receive signal processing for QLM demodulation starts with the wavefront 54 incident at the receiver antenna which forms the receive Rx signal $\hat{v}(t)$ at the antenna output 55 where $\hat{v}/(t)$ is an estimate of the transmitted signal v(t) 52 in FIG. 19 that is received with errors in time $\Delta t$, frequency $\Delta t$ and phase $\Delta\theta$ and additive noise. This received signal $\hat{v}(t)$ is amplified and down-converted to baseband by the analog front end 56, synchronized (synch.) in time t and frequency f, waveform removed to detect the received QLM signal at the QLM symbol rate, inphase and quadrature I/Q detected, and analog-to-digital ADC converted 57. ADC output signal z(i) is de-multiplexed into $n_p$ parallel signals 58 which are offset in time by 0, $\Delta t$, $2\Delta t$, ..., $(n_p-1) \Delta t$ for layers $n=1, 2, \ldots, n_p$ wherein $\Delta t = T_s/n_p$ and $T_s$ is the symbol interval for each layer, and processed by the pre-summed FFT subband filter bank 58 to recover the detected correlated data symbols in each layer. Outputs are ML demodulated 59 to recover estimates of the MS encoded data symbols for each layer for each set of transmitted data symbols by implementing the ML algorithm 4 in equations (7) for the 3-filter and 4-filter groups in each layer. The MS code is removed 59 to recover the data symbols and the outputs are further processed 60,61 to recover estimates $\hat{d}_k$ of the transmitted data words $d_k$ in 46 in FIG. 19.

FIG. 20 applies to the OFDM WiFi QLM mode in the absence of MS decoding by deleting the MS decoding in 59.

This OFDM WIFi QLM architecture applies with parameter changes to the other WiFi options, to WiMax which has a larger frequency band, to the LTE downlink which also uses OFDM, and to the LTE uplink since the QLM architecture generates shaped contiguous subbands which are SC-OFDM.

LTE uplink uses SC-OFDM filter banks which are weighted $FFT^{-1}$ tone filters with the LTE transmission partitioned into sub-frame and frame lengths. LTE filters can be combined into user subbands over the frequency band with each user subband consisting of the weighted tone filters over the user subband frequency band. OFDM QLM ML generates the same weighted $FFT^{-1}$ tone filters by combining each set of 4 $FFT^{-1}$ tones for the 64 point $FFT^{-1}$ for WiFi standard into a weighted subband filter which subband filter is a weighted $FFT^{-1}$ tone filter for a $64/4=16$ point $FFT^{-1}$. This means the OFDM QLM ML architecture developed in this specification directly applies to the LTE uplink with parameter changes for the weighted $FFT^{-1}$ filter spacing, number of filters and frequency band, sub-frame and frame lengths, and communication protocols. In particular this means the QLM ML 2,3,4-data group architecture for transmission of $n_p$ layers or channels of QLM communications can be implemented for the LTE uplink communications and with comparable performance as the OFDM QLM ML communications assuming the frame efficiency for OFDM QLM ML is the same as implemented on the LTE uplink. LTE downlink uses OFDM and which means the OFDM QLM ML architecture in this specification is directly applicable to the LTE downlink.

The ML modulation and demodulation architectures and algorithms and implementations and filings disclosed in this patent for OFDM QLM are examples of available ML, MAP, trellis data symbol, trellis data bit, recursive relaxation, and other optimization architectures and algorithms to recover estimates of data symbols from layered communications channels for the plurality of applications with differentiating parameters that enable demodulation algorithms to recover estimates of the data symbols and for the trellis algorithms to recover the data in the modulated data symbols, in each of the communications layers or channels. This patent covers the plurality of all of these architectures, algorithms, implementations, and filings for generation and for recovery of the data symbols in each of the communications layers as well as decoding of the data symbols.

This patent covers the plurality of everything related to QLM generation for WiFi, WiMax, LTE and OFDM/OFDMA, SC-OFDM waveforms, QLM demodulation for WiFi, WiMax, LTE and OFDM/OFDM, SC-OFDM waveforms, and data recovery of QLM and to the corresponding bounds on QLM to all QLM inclusive of theory, teaching, examples, practice, and of implementations for related technologies. The representative trellis and ML algorithms for QLM demodulation are examples to illustrate the methodology and validate the performance and are representative of all QLM demodulation algorithms including all maximum likelihood ML architectures, maximum a posteriori MAP, maximum a priori, finite field techniques, direct and iterative estimation techniques, trellis symbol and iterative trellis symbol and with/without simplifications, trellis bit and iterative trellis bit and with/without simplifications- and with/without bit error correction coding, and all other related algorithms whose principal function is to recover estimates of the transmitted symbols for QLM parallel layered modulation as well as data recovery related to QLM and the QLM bounds.

Preferred embodiments in the previous description of modulation and demodulation algorithms and implementations for QLM for the known modulations: and demodulations and for all future modulations and demodulations, are provided to enable any person skilled in the art to make or use the present invention. The various modifications to these embodiments will be readily apparent to those skilled in the art and the generic principles defined herein may be applied to other embodiments without the use of the inventive faculty. Thus, the present invention is not intended to be limited to the embodiments shown herein but is to be accorded the wider scope consistent with the principles and novel features disclosed herein. Additional filings for QLM signal processing and bound include the plurality of information theoretic filings with examples being radar, imaging, and media processing.

What is claimed is:

1. A method for implementation of Quadrature Parallel Layered Modulation (QLM) maximum likelihood (ML) communications over orthogonal frequency multiplexing (OFDM) for WiFi or WiMax, said method comprising the steps:

implementing QLM for OFDM transmission over the WiFi or WiMax frequency bands and data packet length by generating a communications signal over a frequency bandwidth at the data symbol rate $n_p/T_s$ and over the data packet length with properties 1) each data symbol is encoded with information and has the same waveform.
2) the Nyquist rate for the data symbol transmission is equal to $1/T_s$,
3) the Nyquist rate is equal to the bandwidth $1/T_s$ of the data symbol waveform and is the data symbol transmission rate $1/T_9$ which is sufficient to transmit all of the information in each data symbol,
4) $n_p$ is the increase in the Nyquist data rate supported by QLM,
5) this increase in Nyquist data rate can be viewed as increasing to $n_p$ the number of parallel communications channels supported by QLM at the data symbol rate $1/T_s$,
6) timing offset $\Delta T_s$ equal to the data symbol spacing $\Delta T_s = T_s/n_p$ is the differentiating parameter when viewing this increase in data symbol rate as parallel communications channels which are independent since the QLM demodulation algorithm recovers the data symbols and data symbol encoded information at the QLM data symbol rate $n_p/T_s$,
7) in the data packet each of these parallel channels of communications has a unique timing offset, channel 1 starts with the first data symbol with no offset, channel 2 starts with the second data symbol offset by $\Delta T_s$, channel 3 starts the third data symbol offset by $2\Delta T_s$, and continuing to the channel n, data symbol with $(n_p-1)\Delta T_s$ offset,
8) in the data packet each of these parallel channels of communications continues until the end of the packet which means channel 1 continues to the last data symbol in the data packet, and channels 2 thru $(n_p-1)$ continue to the second last data symbol in the data packet, and
9) which implements the QLM signal comprising $n_p$ parallel layers of communications channels over the same data symbol frequency bandwidth and over the same data packet length, starting the QLM transmission using a set of contiguous subbands over the OFDM WiFi or WiMax frequency band B and data packet length with each subband occupying the frequency band assigned to a subset of OFDM tones, using a subset of these subbands as data subbands for transmission of the QLM data symbols over the WiFi or WiMax data packet length, generating a first communications signal over the first layer or channel consisting of the data symbols over the ML 2,3,4-data symbol groups in each data subband and disclosed in the specification, at the carrier frequency for the subband by modulating a first set of data symbols with a waveform at a $1/T_s$ symbol rate wherein "$T_s$" is the time interval between contiguous symbols and $1/T_s$ is equal to the Nyquist rate $1/T_s = \Delta B$ for subband spacing $\Delta B$, generating a second communications signal over the second layer or channel consisting of the data symbols over the ML 2,3,4-data symbol groups in each data subband at the same carrier frequency for each subband by modulating a second set of data symbols with the same waveform at the same symbol rate as the first stream of data symbols and with a time offset $\Delta T_s$ equal to $\Delta T_s = T_s/n_p$ wherein "$n_p$" is the number of QLM layers or channels in each subband in the OFDM WiFi or WiMax data packet, for any additional layers or channels, continuing generation of communication signals over the additional layers or channels consisting of the data symbols over the ML 2,3,4-data symbol groups in each data subband at the same carrier frequency for each subband by modulating additional sets of data symbols with the same waveform at the same data symbol rate as the first and second streams of data symbols, with time offsets increasing in each communication signal in increments of $\Delta T_s = T_s/n_p$ until the $n_p$ communications signals are generated for n, QLM layers or channels, generating said QLM ML communications signals consisting of the $n_p$ layere or channels of data symbols over the ML 2,3,4-data symbol groups in each data subband by implementing a computationally efficient post-weighted inverse fast Fourier transform (FFT$^{-1}$)algorithm, transmitting said QLM ML communications signal consisting of the $n_p$ QLM layers or channels in a QLM communications transmitter, receiving said QLM ML communications signals in a receiver and processing said communications signals to generate a set of contiguous subbands over the OFDM WiFi or WiMax frequency band B and data packet length with each subband occupying the frequency band assigned to a subset of OFDM tones, detecting a first set of received correlated data symbols for the first communications layer or channel over the ML 2,3,4-data symbol groups in each data subband in each data packet length by convolving the received communications signal in the data subband with the complex conjugate of the transmitted data symbol subband waveform at the data symbol spacing $T_s$ and synchronized in time to the received set of data symbols in the first of the transmitted communications layers or channels and wherein the correlation in the received set of data symbols is caused by the overlap of the transmitted data symbols, detecting a second set of received correlated data symbols for the second communications layer or channel over the ML 2,3,4-data symbol groups in each data subband in each data packet length by convolving the received communications signal in the data subband with the complex conjugate of the transmitted data symbol subband waveform at the data symbol spacing $T_s$ and starting with the time offset offset $\Delta T_s$ and synchronized in time with the received correlated data symbols in the second of the transmitted communications layers or channels, for any additional transmitted communications layers or channels, continuing detection of the received sets of correlated data symbols over the ML 2,3,4-data symbol groups in each data packet length by convolving the received communications signal in the data subband with the complex conjugate of the transmitted data symbol subband waveform at the data symbol spacing $T_s$ and starting with the time offset offseta which are incremented by $\Delta T_s = T_s/n_p$ until the communications signals are detected for $n_p$ QLM layers or channels, implementing said QLM ML receive $n_p$ sets of correlated data symbol detections with each set corresponding to one of the $n_p$ communications layers or channels of data symbols over the ML 2,3,4-data symbol groups in each data subband by implementing a computationally efficient pre-weighted fast Fourier transform (FFT)algorithm disclosed in the specification, recovering the transmitted data symbols in the receiver by demodulating the detected n, sets of correlated data symbols in a receiver using a ML demodulation algorithm, and combining said algorithm with error correction decoding to recover the transmitted information in the detected data symbols.

2. The method of claim 1 wherein the QLM communication signals have the following communications link performance properties:

maximum capacity "C" in bits/second is defined by equation $C = \max\{n_p B \log_2(1+(S/N)/n_p^2)\}$ wherein the maximum "max" is with respect to $n_p$, "$\log_2$" is the logarithm to the base 2, "B" is the frequency bandwidth in Hz, and "S/N" is the ratio signal-to-noise over "B", maximum number of bits "b" per symbol interval $T_s = 1/B$ is defined by equation $\max\{b\} = \max\{n_p(1+(S/N)/n_p^2)\}$, maximum communications efficiency "Ti" in Bits/second/Hz is defined by equation $\max(\eta) = \max\{b\}$, minimum signal-to-noise ratio per bit "$E_b/N_o$" is defined by equation $\min\{E_b/N_o\} = \min\{[n_p^2 2/b]/[2^b]/n_p - 1]\}$ wherein "$E_b$" is the energy per bit, "$N_a$" is the power spectral density of the noise, and the minimum "min" is the minimum with respect to $n_p$, maximum data symbol rate "$n_p/T_s$" is defined by equation $$\max\{n_p/T_s\} = n_p B$$
$$= n_p(\text{Nyquist rate}), \text{ and}$$

wherein these performance bounds apply to a communications receiver demodulation performance of a QLM communications link consisting of $n_p$ QLM layers or channels and enable the design and implementation of QLM communications over communications links with performance limited by these bounds.

3. The method of claim 1 or 2 wherein the QLM communications systems design and implementation use the QLM design properties:

QLM $E_b/N_o$ is the ratio of energy per information bit $E_b$ to the noise power density $N_o$ and is scaled by the number of QLM layers $n_p$ to derive the value $[E_b/N_o] = E_b/N_o/n_p$ required to support the same bit-error-rate BER as a single layer with $E_b/N_o = [E_b/N_o]$, QLM S/N is the ratio of signal power S to the noise power N and is scaled by the square of the number of QLM layers $n_p$ to derive the value $[S/N] = S/N/n_p^2$ required to support the same BER as a single layer with S/N=[S/N], these QLM scaling laws are bounds on the QLM performance in claim 2 and which bounds are approximated by the QLM ML demodulation performance, these QLM scaling laws when combined with data symbol modulation and measured BER performance enable estimation of the QLM ML demodulation performance which is the number of bits "b" per symbol interval that can be supported for $E_b/N_o$ and S/N, and wherein these QLM scaling laws and parameters are incorporated into the design and implementation of QLM communications transmitters and communications receivers for communications links.

4. The method of claim 1 wherein the transmitted communications QLM ML data symbols for each layer or channel for OFDM WiFi or WiMax are encoded with a multi-scale (MS) code to improve the bit-error-rate (BER) performance, said transmitter encoding and receiver decoding design and implementations comprise the steps:

identifying the set of $N_1$ data subbands and the number $N_0$ of data symbols in each data subband for each QLM layer or channel of communications, generating a code division multiple access (CDMA) code with a code length $N_c$ equal to a product of a number of chips $N_o$ for a first scale CDMA encoding having first code and chip indices used to encode data symbols within each data subband and a number of chips $N_1$ for a second scale CDMA encoding having second code and chip indices used to encode data symbols over the entire set of $N_1$ data subbands, forming a 2-scale CDMA code by assigning code and chip indices such that the 2-scale CDMA code and chip indices are the algebraic addition of the first code and chip indices plus scaled second code and chip indices wherein said scaled second code and chip indices are generated using a scale factor that comprises the number of indices in the first scale CDMA code, wherein the steps of generating and forming further include encoding data symbols with the 2-scale CDMA code to generate encoded chips, and assigning each of the encoded chips to a data subband in accordance with the second CDMA code indices, and assigning each encoded chip to a chip position within its assigned data subband in accordance with the first CDMA code indices by implementing the MS encoding in equation (20) in the specification to generate the encoded data symbols for each QLM layer or channel, using these encoded data symbols to generate the QLM communications signals for transmission by the transmitter, by implementing a computationally efficient post-weighted inverse fast Fourier transform ($FFT^{-1}$) algorithm, transmitting said communications signals consisting of the $n_p$ QLM layers or channels in a QLM communications transmitter, receiving said communications signals in a receiver and processing said communications signals to generate a set of contiguous subbands over the OFDM WiFi or WiMax frequency band B and data packet length with each subband occupying the frequency band assigned to a subset of OFDM tones, implementing the QLM receive signal processing to detect the $n_p$ sets of correlated data symbol with each set corresponding to one of the $n_p$ communications layers or channels by implementing a computationally efficient pre-weighted fast Fourier transform (FFT)algorithm disclosed in the specification, recovering the transmitted data symbols in the receiver for by demodulating the detected $n_p$ sets of correlated data symbols in a receiver using a demodulation algorithm, decoding these demodulated data symbols by implementing the MS decoding in equation (21) in the specification, and combining said MS decoding with error correction decoding to recover the transmitted information.

5. The method of claim 1, wherein the symbol demodulation in the receiver is designed and implemented with a maximum likelihood (ML) algorithm, comprising the steps of:

implementing the QLM ML receive signal processing of the transmitted OFDM WiFi or WiMax QLM ML communications consisting of the n, layere or channels of data symbols over the ML 2,3,4-data symbol groups in each data subband to detect the $n_p$ layers or channels of correlated data symbols by implementing a computationally efficient pre-weighted fast Fourier transform (FFT)algorithm disclosed in the specification, measuring the n by n correlation matrix H whose elements are the correlation coefficients between the n data symbols in each subband for the $n_p$ layers or channels of communications, organizing each set of n detected correlated data symbols for each subband into a n×1 row vector or 1×n column vector which is the detected signal vector Y whose elements are the n detected correlated data symbols, organizing the set of n estimated transmit data symbols for each subband into a n×1 row vector or n×1 column vector X which is the ML solution, evaluating the ML solution $X=H^{-1}Y$ in equation (7) in the specification wherein $H^{-1}$ is the matrix inverse of H for each subband, and using error correction decoding to recover the transmitted information in the encoded data symbols recovered by the ML algorithm.

6. The method of claim 1, further comprising a method for design and implementation of QLM ML for Single Carrier OFDM (SC-OFDM) for long-term evolution (LTE) uplink communications and OFDM QLM ML for LTE downlink communications, said method comprising the steps:

implementing QLM ML for SC-OFDM uplink transmission over the LTE frequency band and data sub-frame and frame lengths, using the QLM ML subband architecture to generate the single-carrier frequency filters which are the subbands in claim 1 and which subbands can be combined to form the LTE user subbands that partition the frequency band into larger user subbands and by transmitting over the LTE sub-frames and frames using the QLM ML 2,3,4-data symbol groups supporting n, layers or channels of communications, generating the $n_p$ layers or channels of communications over each user subband and data symbol group by Implementing a computationally efficient post-weighted inverse fast Fourier transform ($FFT^{-1}$) algorithm, transmitting said communications signals in a LTE communications transmitter on the uplink, receiving said communications signals in a receiver and processing said communications signals to generate each set of user subbands using the subband architecture in claim 1 for each data sub-frame and frame and detecting the transmitted data symbols in each QLM ML 2,3,4-data symbol group supporting $n_p$ layers or channels of communications by implementing said QLM receive correlated data symbol detections with each set corresponding to one of the communications layers or channels using a computationally efficient pre-weighted fast Fourier transform (FFT)algorithm, recovering the transmitted data symbols in the receiver by demodulating the detected $n_p$ sets of correlated data symbols in a receiver using a QLM ML demodulation algorithm, combining said algorithm with error correction decoding to recover the transmitted information, implementing OFDM QLM ML downlink communications using the LTE frequency band and data sub-frames for downlink transmission, implementing said downlink transmission in a transmitter, receiving said communications signals in a receiver and processing said OFDM QLM ML communications to recover estimates of the transmitted data symbols, and using error correction decoding to recover the transmitted information.

* * * * *